US009825901B2

(12) United States Patent
Wang

(10) Patent No.: US 9,825,901 B2
(45) Date of Patent: Nov. 21, 2017

(54) METHOD, DEVICE, AND SYSTEM FOR ACQUIRING INTERNET PROTOCOL ADDRESS

(71) Applicant: Huawei Device Co., Ltd., Shenzhen (CN)

(72) Inventor: Yeqi Wang, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 131 days.

(21) Appl. No.: 14/689,279

(22) Filed: Apr. 17, 2015

(65) Prior Publication Data

US 2015/0222591 A1 Aug. 6, 2015

Related U.S. Application Data

(63) Continuation of application No. PCT/CN2013/085401, filed on Oct. 17, 2013.

(30) Foreign Application Priority Data

Oct. 17, 2012 (CN) .......................... 2012 1 0395271

(51) Int. Cl.
*H04L 29/12* (2006.01)
*H04W 76/04* (2009.01)
(Continued)

(52) U.S. Cl.
CPC .......... *H04L 61/2007* (2013.01); *H04L 61/20* (2013.01); *H04L 61/6086* (2013.01);
(Continued)

(58) Field of Classification Search
None
See application file for complete search history.

(56) References Cited

U.S. PATENT DOCUMENTS

2008/0279133 A1* 11/2008 Bienfait ................. H04W 8/18
370/315
2010/0027467 A1* 2/2010 Wu ........................ H04W 48/18
370/328
(Continued)

FOREIGN PATENT DOCUMENTS

CN 1825827 A 8/2006
CN 102255976 A 11/2011
(Continued)

OTHER PUBLICATIONS

Partial English Translation and Abstract of Chinese Patent Application No. CN102932497A, Part 1, dated Apr. 27, 2015, 17 pages.
(Continued)

*Primary Examiner* — Chi H Pham
*Assistant Examiner* — Soon-Dong D Hyun
(74) *Attorney, Agent, or Firm* — Conley Rose, P.C.

(57) ABSTRACT

A method for acquiring an Internet Protocol (IP) address is provided that pertains to the communications field. The method includes detecting Packet Data Protocol (PDP) connection information between a mobile broadband device and a network side; acquiring identification information if it is detected that the PDP connection information between the mobile broadband device and the network side changes, where the identification information is used to identify the PDP connection information between the mobile broadband device and the network side; and sending the identification information to a host, so that the host acquires an IP address of the host according to the identification information. In the present invention, the mobile broadband device sends the identification information to the host, so that the host sets, according to the identification information, a value of a state identifier included in the host.

20 Claims, 13 Drawing Sheets

(51) Int. Cl.
    *H04W 8/26*      (2009.01)
    *H04L 29/06*     (2006.01)
(52) U.S. Cl.
    CPC ............. *H04L 69/167* (2013.01); *H04W 8/26* (2013.01); *H04W 76/041* (2013.01)

(56) References Cited

U.S. PATENT DOCUMENTS

| | | | |
|---|---|---|---|
| 2011/0013614 A1* | 1/2011 | Chen | H04W 8/087 370/338 |
| 2011/0038372 A1 | 2/2011 | Wijayanathan et al. | |
| 2012/0188908 A1* | 7/2012 | Li | H04L 29/12216 370/254 |
| 2012/0327782 A1* | 12/2012 | Tanaka | H04L 43/50 370/241 |
| 2013/0044709 A1* | 2/2013 | Adjakple | H04W 76/025 370/329 |
| 2014/0064209 A1* | 3/2014 | Anchan | H04W 72/0406 370/329 |
| 2014/0237128 A1 | 8/2014 | Yue | |

FOREIGN PATENT DOCUMENTS

| | | |
|---|---|---|
| CN | 102421201 A | 4/2012 |
| CN | 102577458 A | 7/2012 |
| CN | 102932497 A | 2/2013 |
| WO | 2005060204 A1 | 6/2005 |

OTHER PUBLICATIONS

Partial English Translation and Abstract of Chinese Patent Application No. CN102932497A, Part 2, dated Apr. 27, 2015, 5 pages.
Foreign Communication From a Counterpart Application, Chinese Application No. 201210395271.2, Chinese Office Action dated Oct. 10, 2014, 7 pages.
Foreign Communication From a Counterpart Application, PCT Application No. PCT/CN2013/085401, English Translation of International Search Report dated Jan. 23, 2014, 2 pages.
Foreign Communication From a Counterpart Application, PCT Application No. PCT/CN2013/085401, English Translation of Written Opinion dated Jan. 23, 2014, 10 pages.
"Digital cellular telecommunications system (Phase 2+); Universal Mobile Telecommunications System (UMTS); LTE; Packet domain; Mobile Station (MS) supporting Packet Switched services (3GPP TS 27.060 version 8.1.0 Release 8)," ETSI TS 127 060, V8.1.0, Technical Specification, Jan. 2011, 36 pages.
"Digital cellular telecommunications system (Phase 2+); Universal Mobile Telecommunications System (UMS); LTE; Mobile radio interface Layer 3 specification; Core network protocols; Stage 3 (3GPP TS 24.008 version 8.17.0 Release 8)," ETSI TS 124 008, V8.17.0, Jul. 2012, 594 pages.
Foreign Communication From a Counterpart Application, European Application No. 13847263.4, Extended European Search Report dated Nov. 11, 2015, 9 pages.
"Digital Cellular Telecommunications Systems (Phase 2+); Universal Mobile Telecommunications System (UMTS); LTE; Packet domain; Mobile Station (MS) supporting Packet Switched services (3GPP TS 27.060 version 9.1.0 Release 9)," ETSI TS 127 060, V9.1.0, Technical Specification, Jan. 2011, 35 pages.
Foreign Communication From a Counterpart Application, Japanese Application No. 2015-537133, Japanese Office Action dated Mar. 15, 2016, 4 pages.
Foreign Communication From a Counterpart Application, Japanese Application No. 2015-537133, English Translation of Japanese Office Action dated Mar. 15, 2016, 5 pages.

\* cited by examiner

METHOD, DEVICE, AND SYSTEM FOR ACQUIRING INTERNET PROTOCOL ADDRESS

CROSS-REFERENCE TO RELATED APPLICATIONS

This application is a continuation of International Application No. PCT/CN2013/085401, filed on Oct. 17, 2013, which claims priority to Chinese Patent Application No. 201210395271.2, filed on Oct. 17, 2012, both of which are hereby incorporated by reference in their entireties.

TECHNICAL FIELD

The present invention relates to the communications field, and in particular, to a method, device, and system for acquiring an Internet Protocol (IP) address.

BACKGROUND

In the communications field, an Internet Protocol version 4 (IPv4) network and an Internet Protocol version 6 (IPv6) network coexist, and therefore, a mobile broadband device must support an IPv4 and IPv6 dual stack at the same time. By using the mobile broadband device, a host can acquire an IPv4 address and an IPv6 address and connect to the IPv4 network and the IPv6 network.

Currently, the prior art provides a method that is used by a host to acquire an IPv4 address and an IPv6 address by using a mobile broadband device, and the method may be that the host is connected to the mobile broadband device; if the mobile broadband device establishes an IPv4 Packet Data Protocol (PDP) connection with a network side, the mobile broadband device stores an IPv4 address corresponding to the IPv4 PDP connection, the mobile broadband device sends a connection reporting interrupting message to the host, and the host acquires the IPv4 address from the mobile broadband device and connects to a network according to the IPv4 address; and if the mobile broadband device further establishes an IPv6 PDP connection with the network side and the mobile broadband device stores an IPv6 address corresponding to the IPv6 PDP connection; because the host already establishes a connection with the network side at a current moment and a state of the host is already a connection state, the host does not acquire an IP address any more. Therefore, first, the mobile broadband device needs to send a disconnection reporting interrupting message to the host, and the host disconnects from the network side, and then, the mobile broadband device sends the connection reporting interrupting message to the host, and the host acquires the IPv4 address and the IPv6 address from the mobile broadband device and connects to the network according to the acquired IPv4 address and IPv6 address.

During a process of implementing the present invention, the inventor finds that in the prior art exists at least the following problem.

In the prior art, in a process of acquiring an IPv4 address and an IPv6 address, a host needs to disconnect from a network, as a result, a data service of a user is interrupted.

SUMMARY

To resolve the problem of the prior art, embodiments of the present invention provide a method, device, and system for acquiring an IP address. The technical solutions are as follows.

According to one aspect, a method for acquiring an IP address is provided, where the method includes detecting PDP connection information between a mobile broadband device and a network side; acquiring identification information if it is detected that the PDP connection information between the mobile broadband device and the network side changes, where the identification information is used to identify the PDP connection information between the mobile broadband device and the network side; and sending the identification information to a host, so that the host acquires an IP address of the host according to the identification information.

The acquiring identification information if it is detected that the PDP connection information between the mobile broadband device and the network side changes, includes determining, if it is detected that a PDP connection is established between the mobile broadband device and the network side, that the mobile broadband device and the network side are in a connection state, and acquiring a connection identifier corresponding to the connection state.

Correspondingly, the sending the identification information to a host includes sending a connection reporting interrupting message to the host, where the connection reporting interrupting message carries the connection identifier corresponding to the connection state.

The determining, if it is detected that a PDP connection is established between the mobile broadband device and the network side, that the mobile broadband device and the network side are in a connection state, and acquiring a connection identifier corresponding to the connection state, includes, if it is detected that an IPv4 PDP connection is established between the mobile broadband device and the network side and that an IPv6 PDP connection does not exist between the mobile broadband device and the network side, determining that the mobile broadband device and the network side are in a first connection state, and acquiring a first connection identifier corresponding to the first connection state; if it is detected that an IPv6 PDP connection is established between the mobile broadband device and the network side and that an IPv4 PDP connection does not exist between the mobile broadband device and the network side, determining that the mobile broadband device and the network side are in a second connection state, and acquiring a second connection identifier corresponding to the second connection state; or if after an IPv4 PDP connection exists between the mobile broadband device and the network side, it is detected that an IPv6 PDP connection is established between the mobile broadband device and the network side, or after an IPv6 PDP connection exists between the mobile broadband device and the network side, it is detected that an IPv4 PDP connection is established between the mobile broadband device and the network side, determining that the mobile broadband device and the network side are in a third connection state, and acquiring a third connection identifier corresponding to the third connection state.

The acquiring identification information if it is detected that the PDP connection information between the mobile broadband device and the network side changes, includes acquiring a disconnection identifier if it is detected that a PDP connection existing between the mobile broadband device and the network side is disconnected, where the disconnection identifier is used to identify that the PDP connection between the mobile broadband device and the network side is disconnected.

Correspondingly, the sending the identification information to a host includes sending a disconnection reporting interrupting message to the host, where the disconnection reporting interrupting message carries the disconnection identifier.

The acquiring a disconnection identifier if it is detected that a PDP connection existing between the mobile broadband device and the network side is disconnected, includes acquiring a first disconnection identifier if it is detected that an IPv4 PDP connection existing between the mobile broadband device and the network side is disconnected, where the first disconnection identifier is used to identify that the IPv4 PDP connection between the mobile broadband device and the network side is disconnected; acquiring a second disconnection identifier if it is detected that an IPv6 PDP connection existing between the mobile broadband device and the network side is disconnected, where the second disconnection identifier is used to identify that the IPv6 PDP connection between the mobile broadband device and the network side is disconnected; or acquiring a third disconnection identifier if it is detected that both an IPv4 PDP connection and an IPv6 PDP connection existing between the mobile broadband device and the network side are disconnected, where the third disconnection identifier is used to identify that both the IPv4 PDP connection and the IPv6 PDP connection between the mobile broadband device and the network side are disconnected.

According to another aspect, a method for acquiring an IP address is further provided, where the method includes receiving identification information sent by a mobile broadband device, where the identification information is used to identify PDP connection information between the mobile broadband device and a network side; setting, according to the identification information, a value of a state identifier included in a host; and acquiring an IP address of the host if the value of the state identifier is not an identifier corresponding to a disconnection state.

The receiving identification information sent by a mobile broadband device includes receiving a connection reporting interrupting message sent by the mobile broadband device, where the connection reporting interrupting message carries a connection identifier corresponding to a connection state between the mobile broadband device and the network side.

Correspondingly, the setting, according to the identification information, a value of a state identifier included in a host includes setting the value of the state identifier included in the host to the connection identifier corresponding to the connection state between the mobile broadband device and the network side.

The setting the value of the state identifier included in the host to the connection identifier corresponding to the connection state between the mobile broadband device and the network side includes, if the connection state between the mobile broadband device and the network side is a first connection state, setting the value of the state identifier included in the host to a first connection identifier corresponding to the first connection state, where the first connection state is that an IPv4 PDP connection exists between the mobile broadband device and the network side; if the connection state between the mobile broadband device and the network side is a second connection state, setting the value of the state identifier included in the host to a second connection identifier corresponding to the second connection state, where the second connection state is that an IPv6 PDP connection exists between the mobile broadband device and the network side; or if the connection state between the mobile broadband device and the network side is a third connection state, setting the value of the state identifier included in the host to a third connection identifier corresponding to the third connection state, where the third connection state is that an IPv4 PDP connection and an IPv6 PDP connection exist between the mobile broadband device and the network side.

The receiving identification information sent by a mobile broadband device includes receiving a disconnection reporting interrupting message sent by the mobile broadband device, where the disconnection reporting interrupting message carries a disconnection identifier, and the disconnection identifier is used to identify that a PDP connection between the mobile broadband device and the network side is disconnected.

Correspondingly, the setting, according to the identification information, a value of a state identifier included in a host includes determining a connection state between the mobile broadband device and the network side according to the disconnection identifier, and setting the value of the state identifier included in the host to a connection identifier corresponding to the connection state.

If the disconnection identifier is a first disconnection identifier, and the first disconnection identifier is used to identify that an IPv4 PDP connection between the mobile broadband device and the network side is disconnected, the determining a connection state between the mobile broadband device and the network side according to the disconnection identifier, and setting the value of the state identifier included in the host to a connection identifier corresponding to the connection state includes, if the value of the state identifier included in the host is a first connection identifier, determining, according to the state identifier included in the host, that the mobile broadband device and the network side are in a first connection state before a current moment, where the first connection state is that the IPv4 PDP connection exists between the mobile broadband device and the network side; determining, according to the first disconnection identifier and the first connection state between the mobile broadband device and the network side before the current moment, that the mobile broadband device and the network side are in the disconnection state at the current moment, and setting the value of the state identifier included in the host to the identifier corresponding to the disconnection state; and if the value of the state identifier included in the host is a third connection identifier, determining, according to the state identifier included in the host, that the mobile broadband device and the network side are in a third connection state before a current moment, where the third connection state is that the IPv4 PDP connection and an IPv6 PDP connection exist between the mobile broadband device and the network side; determining, according to the first disconnection identifier and the third connection state between the mobile broadband device and the network side before the current moment, that the mobile broadband device and the network side are in a second connection state at the current moment, and setting the value of the state identifier included in the host to a second connection identifier corresponding to the second connection state, where the second connection state is that the IPv6 PDP connection exists between the mobile broadband device and the network side.

If the disconnection identifier is a second disconnection identifier, where the second disconnection identifier is used to identify that an IPv6 PDP connection between the mobile broadband device and the network side is disconnected, the determining a connection state between the mobile broadband device and the network side according to the disconnection identifier, and setting the value of the state identifier included in the host to a connection identifier corresponding to the connection state includes, if the value of the state identifier included in the host is a second connection identifier, determining, according to the state identifier included in the host, that the mobile broadband device and the network side are in a second connection state before a current moment, where the second connection state is that the IPv6 PDP connection exists between the mobile broadband device and the network side; determining, according to the second disconnection identifier and the second connection state between the mobile broadband device and the network side before the current moment, that the mobile broadband device and the network side are in the disconnection state at the current moment, and setting the value of the state identifier included in the host to the identifier corresponding to the disconnection state; and if the value of the state identifier included in the host is a third connection identifier, determining, according to the state identifier included in the host, that the mobile broadband device and the network side are in a third connection state before a current moment, where the third connection state is that an IPv4 PDP connection and the IPv6 PDP connection exist between the mobile broadband device and the network side; determining, according to the second disconnection identifier and the second connection state between the mobile broadband device and the network side before the current moment, that the mobile broadband device and the network side are in a first connection state at the current moment, and setting the value of the state identifier included in the host to a first connection identifier corresponding to the first connection state, where the first connection state is that the IPv4 PDP connection exists between the mobile broadband device and the network side.

If the disconnection identifier is a third disconnection identifier, where the third disconnection identifier is used to identify that both an IPv4 PDP connection and an IPv6 PDP connection between the mobile broadband device and the network side are disconnected, the determining a connection state between the mobile broadband device and the network side according to the disconnection identifier, and setting the value of the state identifier included in the host to a connection identifier corresponding to the connection state includes determining, according to the third disconnection identifier, that the mobile broadband device and the network side are in the disconnection state, and setting the value of the state identifier included in the host to the identifier corresponding to the disconnection state.

According to another aspect, a mobile broadband device is provided, where the mobile broadband device includes a detecting module configured to detect PDP connection information between a mobile broadband device and a network side; an acquiring module configured to acquire identification information if the detecting module detects that the PDP connection information between the mobile broadband device and the network side changes, where the identification information is used to identify the PDP connection information between the mobile broadband device and the network side; and a sending module configured to send the identification information acquired by the acquiring module to a host, so that the host acquires an IP address of the host according to the identification information.

The acquiring module is configured to, if the detecting module detects that a PDP connection is established between the mobile broadband device and the network side, determine that the mobile broadband device and the network side are in a connection state, and acquire a connection identifier corresponding to the connection state.

Correspondingly, the sending module is configured to send a connection reporting interrupting message to the host, where the connection reporting interrupting message carries the connection identifier that is corresponding to the connection state and acquired by the acquiring module.

The acquiring module includes a first acquiring unit configured to, if the detecting module detects that an IPv4 PDP connection is established between the mobile broadband device and the network side and that an IPv6 PDP connection does not exist between the mobile broadband device and the network side, determine that the mobile broadband device and the network side are in a first connection state, and acquire a first connection identifier corresponding to the first connection state; a second acquiring unit configured to, if the detecting module detects that an IPv6 PDP connection is established between the mobile broadband device and the network side and that an IPv4 PDP connection does not exist between the mobile broadband device and the network side, determine that the mobile broadband device and the network side are in a second connection state, and acquire a second connection identifier corresponding to the second connection state; and a third acquiring unit configured to, if after an IPv4 PDP connection exists between the mobile broadband device and the network side, the detecting module detects that an IPv6 PDP connection is established between the mobile broadband device and the network side, or after an IPv6 PDP connection exists between the mobile broadband device and the network side, the detecting module detects that an IPv4 PDP connection is established between the mobile broadband device and the network side, determine that the mobile broadband device and the network side are in a third connection state, and acquire a third connection identifier corresponding to the third connection state.

The acquiring module is configured to acquire a disconnection identifier if the detecting module detects that a PDP connection existing between the mobile broadband device and the network side is disconnected, where the disconnection identifier is used to identify that the PDP connection between the mobile broadband device and the network side is disconnected.

Correspondingly, the sending module is configured to send a disconnection reporting interrupting message acquired by the acquiring module to the host, where the disconnection reporting interrupting message carries the disconnection identifier acquired by the acquiring module.

The acquiring module further includes a fourth acquiring unit configured to acquire a first disconnection identifier if the detecting module detects that an IPv4 PDP connection existing between the mobile broadband device and the network side is disconnected, where the first disconnection identifier is used to identify that the IPv4 PDP connection between the mobile broadband device and the network side is disconnected; a fifth acquiring unit configured to acquire a second disconnection identifier if the detecting module detects that an IPv6 PDP connection existing between the mobile broadband device and the network side is disconnected, where the second disconnection identifier is used to identify that the IPv6 PDP connection between the mobile broadband device and the network side is disconnected; and a sixth acquiring unit configured to acquire a third disconnection identifier if the detecting module detects that both an IPv4 PDP connection and an IPv6 PDP connection existing between the mobile broadband device and the network side are disconnected, where the third disconnection identifier is used to identify that both the IPv4 PDP connection and the IPv6 PDP connection between the mobile broadband device and the network side are disconnected.

According to another aspect, a host is further provided, where the host includes a receiving module configured to receive identification information sent by a mobile broadband device, where the identification information is used to identify PDP connection information between the mobile broadband device and a network side; a setting module configured to set, according to the identification information, a value of a state identifier included in the host; and an acquiring module configured to acquire an IP address of the host if the value that is of the state identifier and set by the setting module is not an identifier corresponding to a disconnection state.

The receiving module is configured to receive a connection reporting interrupting message sent by the mobile broadband device, where the connection reporting interrupting message carries a connection identifier corresponding to a connection state between the mobile broadband device and the network side.

Correspondingly, the setting module is configured to set the value of the state identifier included in the host to the connection identifier corresponding to the connection state between the mobile broadband device and the network side.

The setting module further includes a first setting unit configured to, if the connection state between the mobile broadband device and the network side is a first connection state, set the value of the state identifier included in the host to a first connection identifier corresponding to the first connection state, where the first connection state is that an IPv4 PDP connection exists between the mobile broadband device and the network side; a second setting unit configured to, if the connection state between the mobile broadband device and the network side is a second connection state, set the value of the state identifier included in the host to a second connection identifier corresponding to the second connection state, where the second connection state is that an IPv6 PDP connection exists between the mobile broadband device and the network side; and a third setting unit configured to, if the connection state between the mobile broadband device and the network side is a third connection state, set the value of the state identifier included in the host to a third connection identifier corresponding to the third connection state, where the third connection state is that an IPv4 PDP connection and an IPv6 PDP connection exist between the mobile broadband device and the network side.

The receiving module is configured to receive a disconnection reporting interrupting message sent by the mobile broadband device, where the disconnection reporting interrupting message carries a disconnection identifier, and the disconnection identifier is used to identify that a PDP connection between the mobile broadband device and the network side is disconnected.

Correspondingly, the setting module is configured to determine a connection state between the mobile broadband device and the network side according to the disconnection identifier received by the receiving module, and set the value of the state identifier included in the host to a connection identifier corresponding to the connection state.

If the disconnection identifier received by the receiving module is a first disconnection identifier, where the first disconnection identifier is used to identify that an IPv4 PDP connection between the mobile broadband device and the network side is disconnected, the setting module further includes a fourth setting unit configured to, if the value of the state identifier included in the host is a first connection identifier, determine, according to the state identifier included in the host, that the mobile broadband device and the network side are in a first connection state before a current moment, where the first connection state is that the IPv4 PDP connection exists between the mobile broadband device and the network side; determine, according to the first disconnection identifier received by the receiving module and the first connection state between the mobile broadband device and the network side before the current moment, that the mobile broadband device and the network side are in the disconnection state at the current moment, and set the value of the state identifier included in the host to the identifier corresponding to the disconnection state; and a fifth setting unit configured to, if the value of the state identifier included in the host is a third connection identifier, determine, according to the state identifier included in the host, that the mobile broadband device and the network side are in a third connection state before a current moment, where the third connection state is that the IPv4 PDP connection and an IPv6 PDP connection exist between the mobile broadband device and the network side; determine, according to the first disconnection identifier received by the receiving module and the third connection state between the mobile broadband device and the network side before the current moment, that the mobile broadband device and the network side are in a second connection state at the current moment, and set the value of the state identifier included in the host to a second connection identifier corresponding to the second connection state, where the second connection state is that the IPv6 PDP connection exists between the mobile broadband device and the network side.

If the disconnection identifier received by the receiving module is a second disconnection identifier, where the second disconnection identifier is used to identify that an IPv6 PDP connection between the mobile broadband device and the network side is disconnected, the setting module further includes a sixth setting unit configured to, if the value of the state identifier included in the host is a second connection identifier, determine, according to the state identifier included in the host, that the mobile broadband device and the network side are in a second connection state before a current moment, where the second connection state is that the IPv6 PDP connection exists between the mobile broadband device and the network side; determine, according to the second disconnection identifier received by the receiving module and the second connection state between the mobile broadband device and the network side before the current moment, that the mobile broadband device and the network side are in the disconnection state at the current moment, and set the value of the state identifier included in the host to the identifier corresponding to the disconnection state; and a seventh setting unit configured to, if the value of the state identifier included in the host is a third connection identifier, determine, according to the state identifier included in the host, that the mobile broadband device and the network side are in a third connection state before a current moment, where the third connection state is that an IPv4 PDP connection and the IPv6 PDP connection exist between the mobile broadband device and the network side; determine, according to the second disconnection identifier received by the receiving module and the third connection state between the mobile broadband device and the network side before the current moment, that the mobile broadband device and the network side are in a first connection state at the current moment, and set the value of the state identifier included in the host to a first connection identifier corresponding to the first connection state, where the first connection state is that the IPv4 PDP connection exists between the mobile broadband device and the network side.

If the disconnection identifier received by the receiving module is a third disconnection identifier, where the third disconnection identifier is used to identify that both an IPv4 PDP connection and an IPv6 PDP connection between the mobile broadband device and the network side are disconnected, the setting module further includes an eighth setting unit configured to determine, according to the third disconnection identifier received by the receiving module, that the mobile broadband device and the network side are in the disconnection state at the current moment, and set the value of the state identifier included in the host to the identifier corresponding to the disconnection state.

According to another aspect, a system for acquiring an IP address is provided, where the system includes a mobile broadband device and a host.

According to another aspect, a mobile broadband device is provided, where the mobile broadband device includes a processor and a memory, and is configured to perform a method for acquiring an IP address.

According to another aspect, a host is provided, where the host includes a processor and a memory, and is configured to perform a method for acquiring an IP address.

Beneficial effects brought by the technical solutions provided in the embodiments of present invention are as follows.

A mobile broadband device sends identification information to a host, so that the host sets, according to the identification information, a value of a state identifier included in the host. Values of different state identifiers are corresponding to different connection states between the mobile broadband device and a network side. As long as the value of the state identifier is not an identifier corresponding to a disconnection state, the host queries the mobile broadband device and acquires an IP address; and as long as the value of the state identifier is the identifier corresponding to the disconnection state, the host disconnects from the network side. Compared with the prior art, in the embodiments of the present invention, regardless of a sequence of or a time interval between establishment of an IPv4 PDP connection and an IPv6 PDP connection by the mobile broadband device, a network does not need to be disconnected in a process in which the host acquires an IPv4 address and an IPv6 address, so that a data service of a user is not interrupted. In addition, after the host acquires the IPv4 address and the IPv6 address and one PDP connection of the IPv4 PDP connection and the IPv6 PDP connection between the mobile broadband device and the network side is disconnected, the host may further acquire an IP address corresponding to the other PDP connection and connect to a corresponding network, so that the user can use an available network more effectively.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

Embodiment 1

Figure 1:
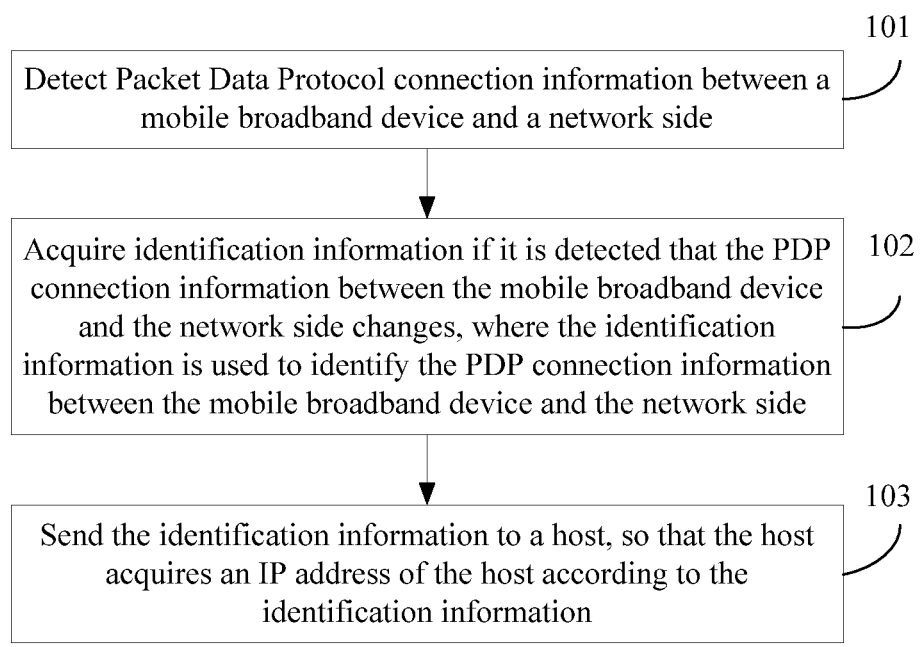
FIG. 1 is a flowchart of a method for acquiring an IP address according to Embodiment 1 of the present invention.

This embodiment provides a method for acquiring an IP address. Referring to FIG. 1, the method includes the following steps.

101: Detect PDP connection information between a mobile broadband device and a network side;

102: Acquire identification information if it is detected that the PDP connection information between the mobile broadband device and the network side changes, where the identification information is used to identify the PDP connection information between the mobile broadband device and the network side; and

103: Send the identification information to a host, so that the host acquires an IP address of the host according to the identification information.

In conclusion, according to the method provided in this embodiment of the present invention, a mobile broadband device sends identification information to a host, so that the host acquires an IP address of the host according to the identification information. Compared with the prior art, in this embodiment of the present invention, regardless of a sequence of or a time interval between establishment of an IPv4 PDP connection and an IPv6 PDP connection by the mobile broadband device, a network does not need to be disconnected in a process in which the host acquires an IPv4 address and an IPv6 address, so that a data service of a user is not interrupted.

Embodiment 2

Figure 2:
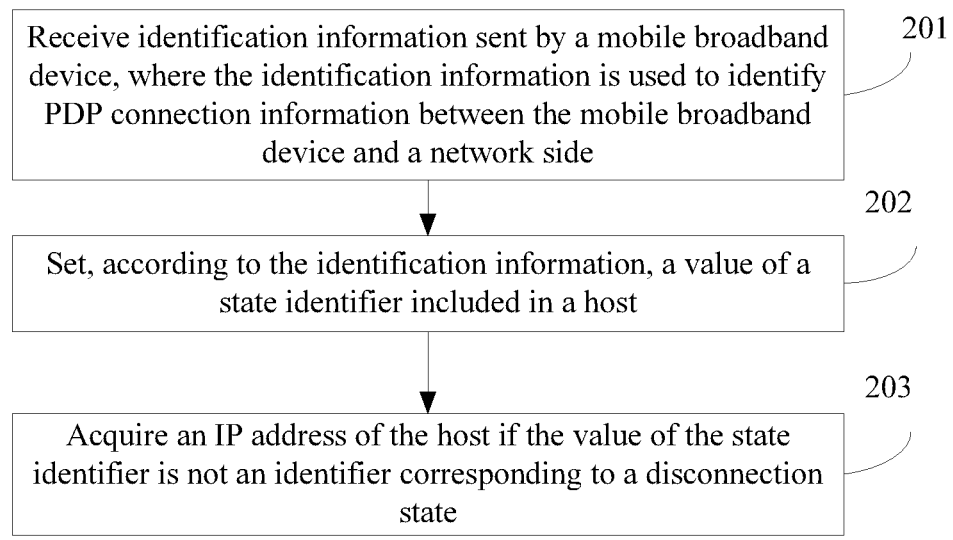
FIG. 2 is a flowchart of a method for acquiring an IP address according to Embodiment 2 of the present invention.

This embodiment provides a method for acquiring an IP address. Referring to FIG. 2, the method includes the following steps.

201: Receive identification information sent by a mobile broadband device, where the identification information is used to identify PDP connection information between the mobile broadband device and a network side;

202: Set, according to the identification information, a value of a state identifier included in a host; and

203: Acquire an IP address of the host if the value of the state identifier is not an identifier corresponding to a disconnection state.

In conclusion, according to the method provided in this embodiment of the present invention, identification information sent by a mobile broadband device is received, and a value of a state identifier included in a host is set according to the identification information. As long as the value of the state identifier is not the identifier corresponding to the disconnection state, the host can query and acquire an IP address. Compared with the prior art, in this embodiment of the present invention, regardless of a sequence of or a time interval between establishment of an IPv4 PDP connection and an IPv6 PDP connection by the mobile broadband device, a network does not need to be disconnected in a process in which the host acquires an IPv4 address and an IPv6 address, so that a data service of a user is not interrupted.

Embodiment 3

Figure 3:
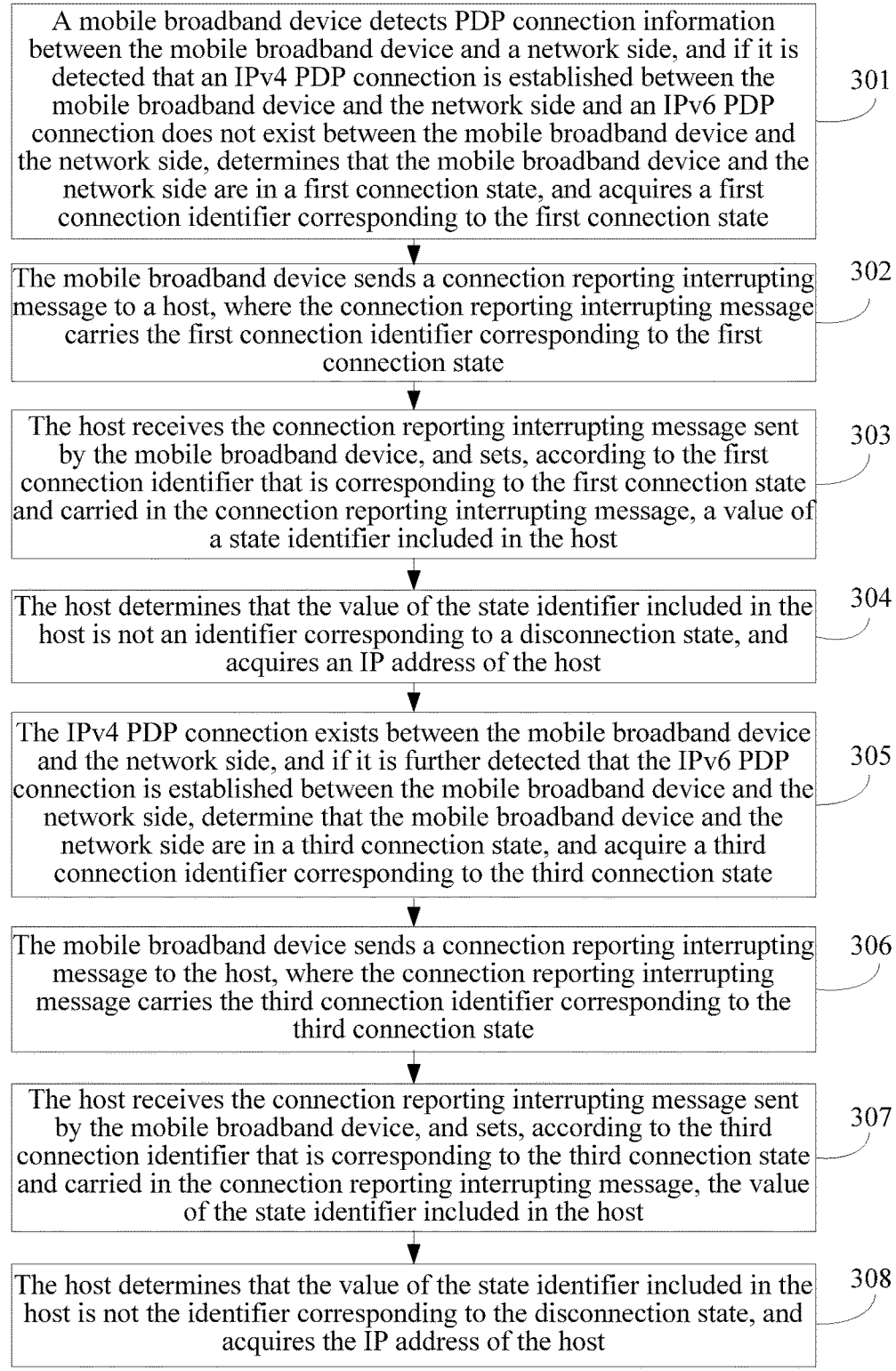
FIG. 3 is a flowchart of a method for acquiring an IP address according to Embodiment 3 of the present invention.

This embodiment of the present invention provides a method for acquiring an IP address. A host is connected to a mobile broadband device, and the mobile broadband device supports an IPv4 and IPv6 dual stack. At first, a PDP connection does not exist between the mobile broadband device and a network side. If an IPv4 PDP connection is first established and then an IPv6 PDP connection is established between the mobile broadband device and the network side, by using the method in this embodiment, the host can acquire an IPv4 address corresponding to the IPv4 PDP connection and an IPv6 address corresponding to the IPv6 PDP connection. Referring to FIG. 3, the method includes the following steps.

301: A mobile broadband device detects PDP connection information between the mobile broadband device and a network side, and if it is detected that an IPv4 PDP connection is established between the mobile broadband device and the network side and an IPv6 PDP connection does not exist between the mobile broadband device and the network side, determines that the mobile broadband device and the network side are in a first connection state, and acquires a first connection identifier corresponding to the first connection state.

The mobile broadband device may be a device such as a third generation (3G) wide area network (WAN) card or a mobile phone that can provide a wireless network connection function, and the present invention constitutes no specific limitation to the mobile broadband device herein. When the IPv4 PDP connection is established, the mobile broadband device acquires the IPv4 address corresponding to the IPv4 PDP connection, and stores the IPv4 address in the mobile broadband device.

The first connection state is that the IPv4 PDP connection exists between the mobile broadband device and the network side; a size of the first connection identifier may be one byte, two bytes, or the like, and a value of the first connection identifier may be 1, 2, or the like; and a specific size and value of the first connection identifier are not limited herein.

302: The mobile broadband device sends a connection reporting interrupting message to the host, where the connection reporting interrupting message carries the first connection identifier corresponding to the first connection state.

A connection identifier field is added to the connection reporting interrupting message, and the connection identifier field is used to carry the first connection identifier corresponding to the first connection state.

The host may be a device such as a personal computer that can connect to the network side by using the mobile broadband device, and the host is not limited herein.

303: The host receives the connection reporting interrupting message sent by the mobile broadband device, and sets, according to the first connection identifier that is corresponding to the first connection state and carried in the connection reporting interrupting message, a value of a state identifier included in the host.

The host receives the connection reporting interrupting message sent by the mobile broadband device, and sets the value of the state identifier included in the host to the first connection identifier that is corresponding to the first connection state and carried in the connection reporting interrupting message.

Figure 4:
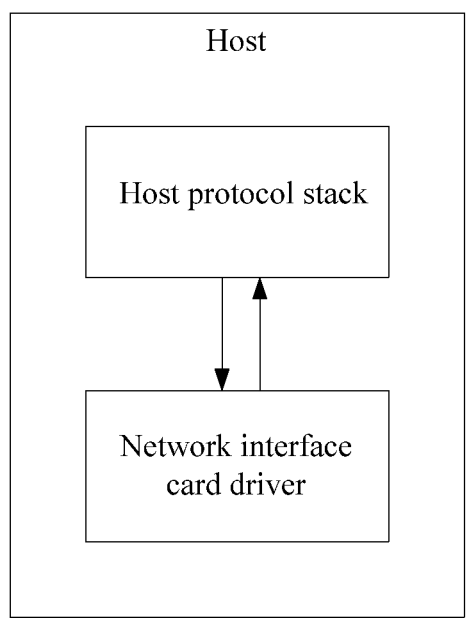
FIG. 4 is a schematic structural diagram of a host according to Embodiment 3 of the present invention.

Referring to FIG. 4, the host includes a network interface card driver and a host protocol stack, and the network interface card driver of the host includes the state identifier; and correspondingly, that the host receives the connection reporting interrupting message sent by the mobile broadband device, and sets, according to the first connection identifier that is corresponding to the first connection state and carried in the connection reporting interrupting message, a value of a state identifier included in the host may include that the network interface card driver receives the connection reporting interrupting message sent by the mobile broadband device, and sets the value of the state identifier included in the host to the first connection identifier that is corresponding to the first connection state and carried in the connection reporting interrupting message.

304: The host determines that the value of the state identifier included in the host is not an identifier corresponding to a disconnection state, and acquires an IP address of the host.

When the value of the state identifier included in the host changes, the host performs determining on the value of the state identifier. If it is determined that the value of the state identifier is not the identifier corresponding to the disconnection state, the host acquires the IP address of the host and connects to the network side; and if it is determined that the value of the state identifier is the identifier corresponding to the disconnection state, the host disconnects from the network side.

The network interface card driver of the host performs determining on the value of the state identifier included in the host. If it is determined that the value of the state identifier is not the identifier corresponding to the disconnection state, the network interface card driver sends a connection state reporting message to the host protocol stack; after receiving the connection state reporting message sent by the network interface card driver, the host protocol stack performs an operation of initializing a host network interface card, and then sends a query command to the mobile broadband device; and the host protocol stack receives a query response returned by the mobile broadband device, acquires the IP address carried in the query response, and connects to the network side. If it is determined that the value of the state identifier is the identifier corresponding to the disconnection state, the network interface card driver sends a disconnection state reporting message to the host protocol stack, and the host protocol stack disconnects from the network side.

The identifier corresponding to the disconnection state is used to identify that the mobile broadband device and the network side are in the disconnection state.

In this step, the value of the state identifier included in the host is the first connection identifier, which indicates that the IPv4 PDP connection exists between the mobile broadband device and the network side. The network interface card driver performs determining on the value of the state identifier, and determines that the value of the state identifier is not the identifier corresponding to the disconnection state, and then the network interface card driver sends the connection state reporting message to the host protocol stack; after receiving the connection state reporting message sent by the network interface card driver, the host protocol stack performs the operation of initializing the host network interface card, and then sends the query command to the mobile broadband device; the mobile broadband device receives the query command sent by the host protocol stack, acquires the IPv4 address that is corresponding to the IPv4 PDP connection and stored in the mobile broadband device, and sends the query response to the host protocol stack, where the query response carries the acquired IPv4 address; and after receiving the query response sent by the mobile broadband device, the host protocol stack acquires the IPv4 address carried in the query response and connects to an IPv4 network.

305: The IPv4 PDP connection exists between the mobile broadband device and the network side, and if it is further detected that the IPv6 PDP connection is established between the mobile broadband device and the network side, determine that the mobile broadband device and the network side are in a third connection state, and acquire a third connection identifier corresponding to the third connection state.

When the IPv6 PDP connection is established, the mobile broadband device acquires the IPv6 address corresponding to the IPv6 PDP connection, and stores the IPv6 address in the mobile broadband device. In this case, the mobile broadband device stores the IPv4 address corresponding to the IPv4 PDP connection and the IPv6 address corresponding to the IPv6 PDP connection.

The third connection state is that the IPv4 PDP connection and the IPv6 PDP connection exist between the mobile broadband device and the network side; a size of the third connection identifier may be one byte, two bytes, or the like, and a value of the third connection identifier may be 3, 4, or the like; and a specific size and value of the third connection identifier are not limited herein.

306: The mobile broadband device sends a connection reporting interrupting message to the host, where the connection reporting interrupting message carries the third connection identifier corresponding to the third connection state.

A connection identifier field in the connection reporting interrupting message is used to carry the third connection identifier corresponding to the third connection state.

307: The host receives the connection reporting interrupting message sent by the mobile broadband device, and sets, according to the third connection identifier that is corresponding to the third connection state and carried in the connection reporting interrupting message, the value of the state identifier included in the host.

The host receives the connection reporting interrupting message sent by the mobile broadband device, and sets the value of the state identifier included in the host to the third connection identifier that is corresponding to the third connection state and carried in the connection reporting interrupting message.

The network interface card driver included in the host receives the connection reporting interrupting message sent by the mobile broadband device, and sets the value of the state identifier included in the host to the third connection identifier that is corresponding to the third connection state and carried in the connection reporting interrupting message.

308: The host determines that the value of the state identifier included in the host is not the identifier corresponding to the disconnection state, and acquires the IP address of the host.

The connection already exists between the host and the IPv4 network. When the host determines that the value of the state identifier included in the host is not the identifier corresponding to the disconnection state, the host does not disconnect from the IPv4 network, but sends the query command to the mobile broadband device and acquires the IP address of the host that is stored in the mobile broadband device. In this case, the IPv4 address and the IPv6 address can be acquired.

The network interface card driver of the host performs determining on the value of the state identifier included in the host, and determines that the value of the state identifier is not the identifier corresponding to the disconnection state.

In this step, the value of the state identifier included in the host is the third connection identifier, which indicates that the IPv4 PDP connection and the IPv6 PDP connection exist between the mobile broadband device and the network side. The network interface card driver performs determining on the value of the state identifier, and determines that the value of the state identifier is not the identifier corresponding to the disconnection state, and then the network interface card driver sends the connection state reporting message to the host protocol stack; after receiving the connection state reporting message sent by the network interface card driver, the host protocol stack does not disconnect from the IPv4 network, but sends the query command to the mobile broadband device; and the mobile broadband device receives the query command sent by the host protocol stack, acquires the IPv4 address and the IPv6 address that are stored in the mobile broadband device itself, and sends the query response to the host protocol stack, where the IPv4 address is corresponding to the IPv4 PDP connection, the IPv6 address is corresponding to the IPv6 PDP connection, and the query response carries the acquired IPv4 address and IPv6 address. After receiving the query response sent by the mobile broadband device, the host protocol stack acquires the IPv4 address and the IPv6 address that are carried in the query response. Because the host already connects to the IPv4 network, the host further connects to an IPv6 network according to the IPv6 address carried in the query response.

In conclusion, according to the method provided in this embodiment of the present invention, a mobile broadband device sends identification information to a host, so that the host sets, according to the identification information, a value of a state identifier included in the host. Values of different state identifiers are corresponding to different connection states between the mobile broadband device and a network side. As long as the value of the state identifier is not an identifier corresponding to a disconnection state, the host queries the mobile broadband device and acquires an IP address; and as long as the value of the state identifier is the identifier corresponding to the disconnection state, the host disconnects from the network side. Compared with the prior art, in this embodiment of the present invention, regardless of a sequence of or a time interval between establishment of an IPv4 PDP connection and an IPv6 PDP connection by the mobile broadband device, a network does not need to be disconnected in a process in which the host acquires an IPv4 address and an IPv6 address, so that a data service of a user is not interrupted.

Embodiment 4

Figure 5:
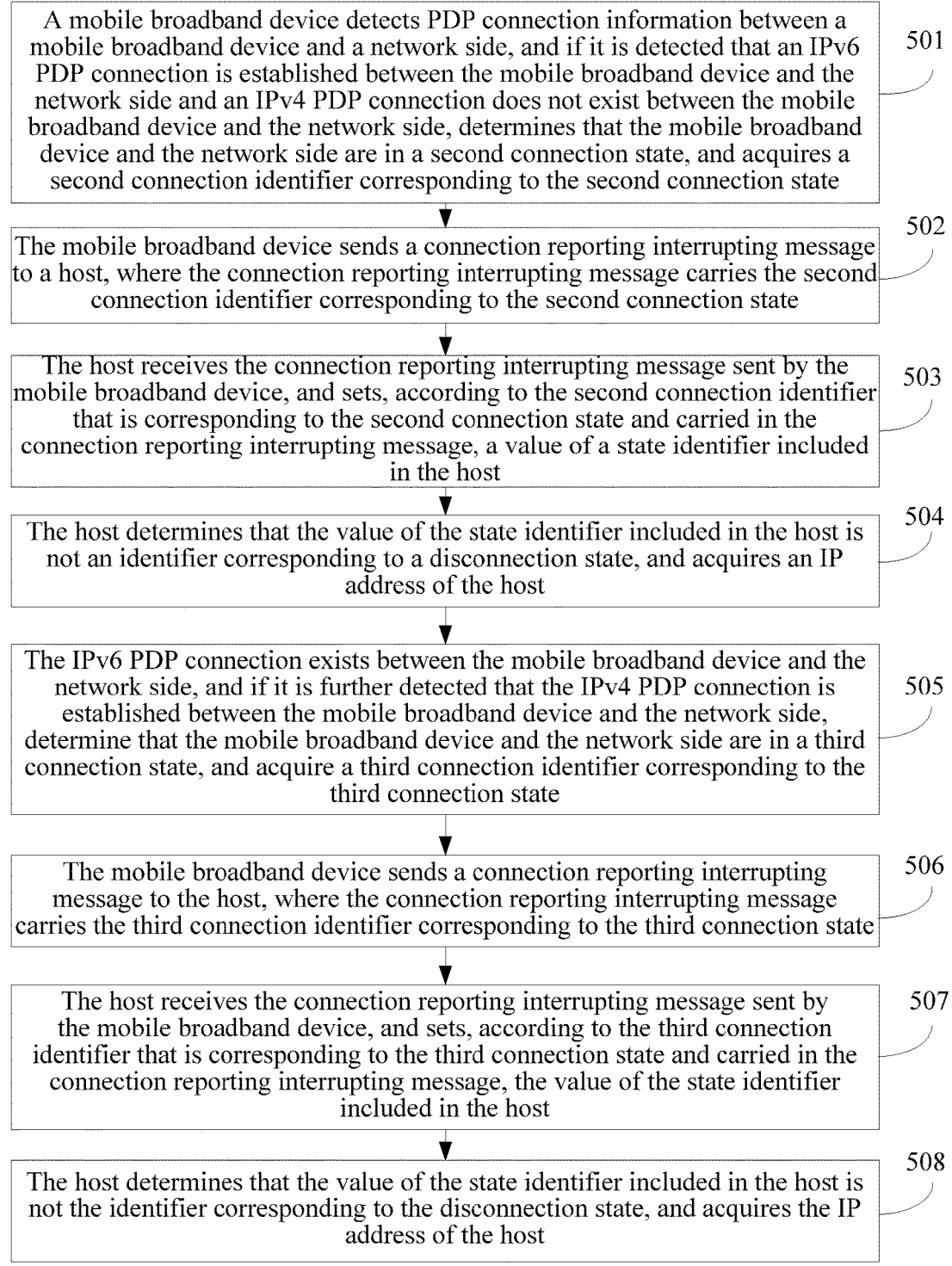
FIG. 5 is a flowchart of a method for acquiring an IP address according to Embodiment 4 of the present invention.

This embodiment of the present invention provides a method for acquiring an IP address. A host is connected to a mobile broadband device, and the mobile broadband device supports an IPv4 and IPv6 dual stack. At first, a PDP connection does not exist between the mobile broadband device and a network side. If an IPv6 PDP connection is first established and then an IPv4 PDP connection is established between the mobile broadband device and the network side, by using the method in this embodiment, the host can acquire an IPv6 address corresponding to the IPv6 PDP connection and an IPv4 address corresponding to the IPv4 PDP connection. Referring to FIG. 5, the method includes the following steps.

501: A mobile broadband device detects PDP connection information between a mobile broadband device and a network side, and if it is detected that an IPv6 PDP connection is established between the mobile broadband device and the network side and an IPv4 PDP connection does not exist between the mobile broadband device and the network side, determines that the mobile broadband device and the network side are in a second connection state, and acquires a second connection identifier corresponding to the second connection state.

The mobile broadband device may be a device such as a 3G WAN card or a mobile phone that can provide a wireless network connection function, and the present invention constitutes no specific limitation to the mobile broadband device herein. When the IPv6 PDP connection is established, the mobile broadband device acquires the IPv6 address corresponding to the IPv6 PDP connection, and stores the IPv6 address in the mobile broadband device.

The second connection state is that the IPv6 PDP connection exists between the mobile broadband device and the network side; a size of the second connection identifier may be one byte, two bytes, or the like, and a value of the second connection identifier may be 5, 6, or the like; and a specific size and value of the second connection identifier are not limited herein.

502: The mobile broadband device sends a connection reporting interrupting message to the host, where the connection reporting interrupting message carries the second connection identifier corresponding to the second connection state.

A connection identifier field is added to the connection reporting interrupting message, and the connection identifier field is used to carry the second connection identifier corresponding to the second connection state.

The host may be a device such as a personal computer that can connect to the network side by using the mobile broadband device, and the host is not limited herein.

503: The host receives the connection reporting interrupting message sent by the mobile broadband device, and sets, according to the second connection identifier that is corresponding to the second connection state and carried in the connection reporting interrupting message, a value of a state identifier included in the host.

The host receives the connection reporting interrupting message sent by the mobile broadband device, and sets the value of the state identifier included in the host to the second connection identifier that is corresponding to the second connection state and carried in the connection reporting interrupting message.

The host includes a network interface card driver and a host protocol stack. The network interface card driver included in the host receives the connection reporting interrupting message sent by the mobile broadband device, and sets the value of the state identifier included in the host to the second connection identifier that is corresponding to the second connection state and carried in the connection reporting interrupting message.

504: The host determines that the value of the state identifier included in the host is not an identifier corresponding to a disconnection state, and acquires an IP address of the host.

When the value of the state identifier included in the host changes, the host performs determining on the value of the state identifier. If it is determined that the value of the state identifier is not the identifier corresponding to the disconnection state, the host acquires the IP address of the host and connects to the network side; and if it is determined that the value of the state identifier is the identifier corresponding to the disconnection state, the host disconnects from the network side.

The network interface card driver of the host performs determining on the value of the state identifier included in the host. If it is determined that the value of the state identifier is not the identifier corresponding to the disconnection state, the network interface card driver sends a connection state reporting message to the host protocol stack; after receiving the connection state reporting message sent by the network interface card driver, the host protocol stack performs an operation of initializing a host network interface card, and then sends a query command to the mobile broadband device; and the host protocol stack receives a query response returned by the mobile broadband device, acquires the IP address carried in the query response, and connects to the network side. If it is determined that the value of the state identifier is the identifier corresponding to the disconnection state, the network interface card driver sends a disconnection state reporting message to the host protocol stack, and the host protocol stack disconnects from the network side.

The identifier corresponding to the disconnection state is used to identify that the mobile broadband device and the network side are in the disconnection state.

In this step, the value of the state identifier included in the host is the second connection identifier, which indicates that the IPv6 PDP connection exists between the mobile broadband device and the network side. The network interface card driver performs determining on the value of the state identifier, and determines that the value of the state identifier is not the identifier corresponding to the disconnection state, and then sends the connection state reporting message to the host protocol stack; after receiving the connection state reporting message sent by the network interface card driver, the host protocol stack performs the operation of initializing the host network interface card, and then sends the query command to the mobile broadband device; the mobile broadband device receives the query command sent by the host protocol stack, acquires the IPv6 address that is corresponding to the IPv6 PDP connection and stored in the mobile broadband device itself, and sends the query response to the host protocol stack, where the query response carries the acquired IPv6 address; and after receiving the query response sent by the mobile broadband device, the host protocol stack acquires the IPv6 address carried in the query response and connects to an IPv6 network.

505: The IPv6 PDP connection exists between the mobile broadband device and the network side, and if it is further detected that the IPv4 PDP connection is established between the mobile broadband device and the network side, determine that the mobile broadband device and the network side are in a third connection state, and acquire a third connection identifier corresponding to the third connection state.

When the IPv4 PDP connection is established, the mobile broadband device acquires the IPv4 address corresponding to the IPv4 PDP connection, and stores the IPv4 address in the mobile broadband device. In this case, the mobile broadband device stores the IPv4 address corresponding to the IPv4 PDP connection and the IPv6 address corresponding to the IPv6 PDP connection.

The third connection state is that the IPv4 PDP connection and the IPv6 PDP connection exist between the mobile broadband device and the network side; a size of the third connection identifier may be one byte, two bytes, or the like, and a value of the third connection identifier may be 3, 4, or the like; and a specific size and value of the third connection identifier are not limited herein.

506: The mobile broadband device sends a connection reporting interrupting message to the host, where the connection reporting interrupting message carries the third connection identifier corresponding to the third connection state.

A connection identifier field in the connection reporting interrupting message is used to carry the third connection identifier corresponding to the third connection state.

507: The host receives the connection reporting interrupting message sent by the mobile broadband device, and sets, according to the third connection identifier that is corresponding to the third connection state and carried in the connection reporting interrupting message, the value of the state identifier included in the host.

The host receives the connection reporting interrupting message sent by the mobile broadband device, and sets the value of the state identifier included in the host to the third connection identifier that is corresponding to the third connection state and carried in the connection reporting interrupting message.

The network interface card driver included in the host receives the connection reporting interrupting message sent by the mobile broadband device, and sets the value of the state identifier included in the host to the third connection identifier that is corresponding to the third connection state and carried in the connection reporting interrupting message.

508: The host determines that the value of the state identifier included in the host is not the identifier corresponding to the disconnection state, and acquires the IP address of the host.

The connection already exists between the host and the IPv6 network. When the host determines that the value of the state identifier included in the host is not the identifier corresponding to the disconnection state, the host does not disconnect from the IPv6 network, but sends the query command to the mobile broadband device and acquires the IP address of the host that is stored in the mobile broadband device. In this case, the host can acquire the IPv4 address and the IPv6 address.

The network interface card driver of the host performs determining on the value of the state identifier included in the host, and determines that the value of the state identifier is not the identifier corresponding to the disconnection state.

In this step, the value of the state identifier included in the host is the third connection identifier, which indicates that the IPv4 PDP connection and the IPv6 PDP connection exist between the mobile broadband device and the network side. The network interface card driver performs determining on the value of the state identifier, and determines that the value of the state identifier is not the identifier corresponding to the disconnection state, and then sends the connection state reporting message to the host protocol stack; after receiving the connection state reporting message sent by the network interface card driver, the host protocol stack does not disconnect from the IPv6 network, but sends the query command to the mobile broadband device; and the mobile broadband device receives the query command sent by the host protocol stack, acquires the IPv4 address and the IPv6 address that are stored in the mobile broadband device itself, and sends the query response to the host protocol stack, where the IPv4 address is corresponding to the IPv4 PDP connection, the IPv6 address is corresponding to the IPv6 PDP connection, and the query response carries the acquired IPv4 address and IPv6 address. After receiving the query response sent by the mobile broadband device, the host protocol stack acquires the IPv4 address and the IPv6 address that are carried in the query response. Because the host already connects to the IPv6 network, the host further connects to an IPv4 network according to the IPv4 address carried in the query response.

In conclusion, according to the method provided in this embodiment of the present invention, a mobile broadband device sends identification information to a host, so that the host sets, according to the identification information, a value of a state identifier included in the host. Values of different state identifiers are corresponding to different connection states between the mobile broadband device and a network side. As long as the value of the state identifier is not an identifier corresponding to a disconnection state, the host queries the mobile broadband device and acquires an IP address; and as long as the value of the state identifier is the identifier corresponding to the disconnection state, the host disconnects from the network side. Compared with the prior art, in this embodiment of the present invention, regardless of a sequence of or a time interval between establishment of an IPv4 PDP connection and an IPv6 PDP connection by the mobile broadband device, a network does not need to be disconnected in a process in which the host acquires an IPv4 address and an IPv6 address, so that a data service of a user is not interrupted.

Embodiment 5

Figure 6:
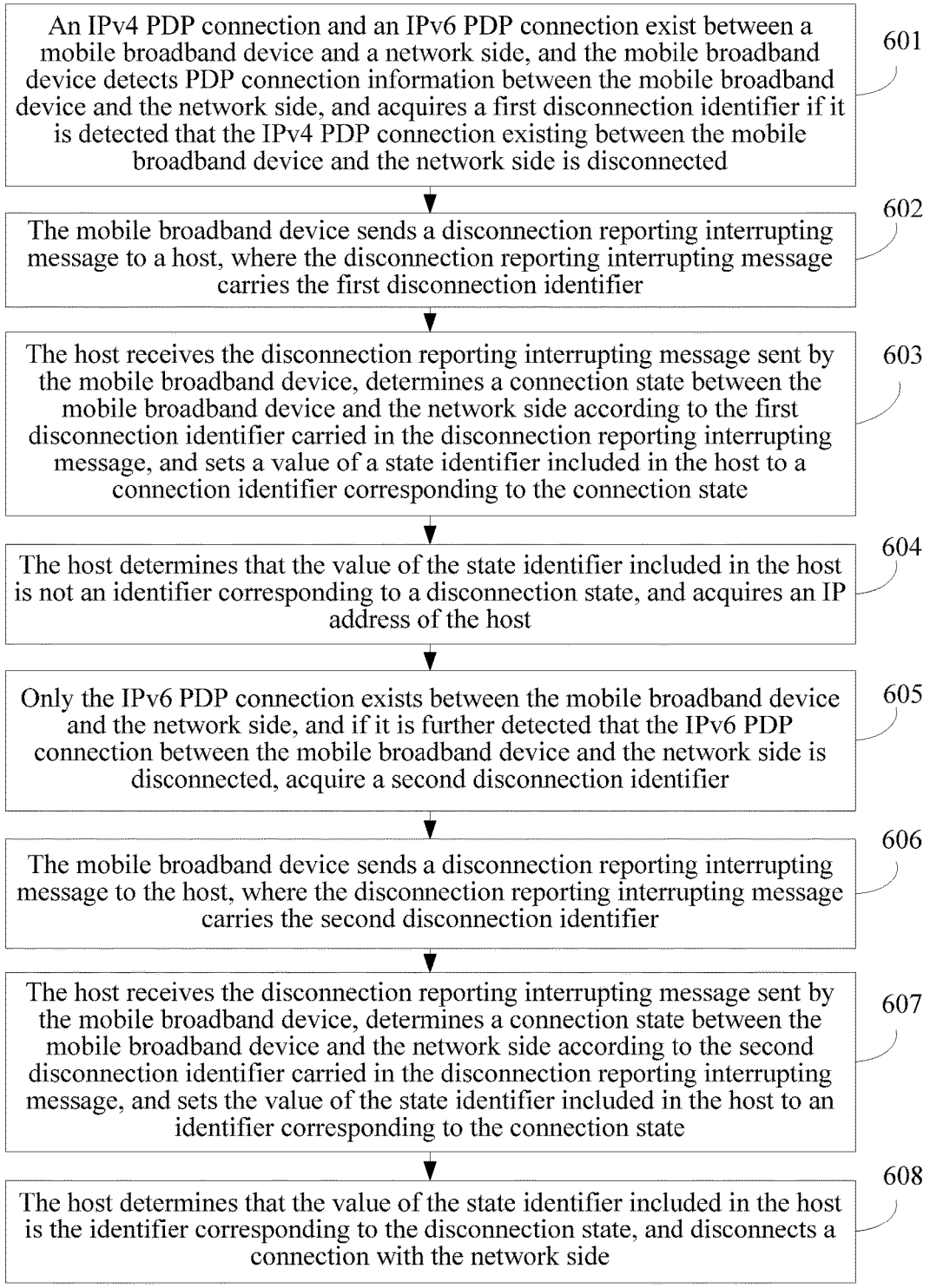
FIG. 6 is a flowchart of a method for acquiring an IP address according to Embodiment 5 of the present invention.

This embodiment of the present invention provides a method for acquiring an IP address. A host is connected to a mobile broadband device, and the mobile broadband device supports an IPv4 and IPv6 dual stack. At first, an IPv4 PDP connection and an IPv6 PDP connection exist between a mobile broadband device and a network side. By using the method in this embodiment, when the IPv4 PDP connection that exists between the mobile broadband device and the network side is disconnected, the host may acquire an IPv6 address corresponding to the IPv6 PDP connection that exists between the mobile broadband device and the network device, and connects to an IPv6 network. When the IPv6 PDP connection that exists between the mobile broadband device and the network device is also disconnected, the host disconnects from the network side. Referring to FIG. 6, the method includes the following steps.

601: An IPv4 PDP connection and an IPv6 PDP connection exist between a mobile broadband device and a network side, and the mobile broadband device detects PDP connection information between the mobile broadband device and the network side, and acquires a first disconnection identifier if it is detected that the IPv4 PDP connection existing between the mobile broadband device and the network side is disconnected.

The mobile broadband device may be a device such as a 3G WAN card or a mobile phone that can provide a wireless network connection function, and the present invention constitutes no specific limitation to the mobile broadband device herein. The IPv4 PDP connection and the IPv6 PDP connection exist between the mobile broadband device and the network side at first. When the IPv4 PDP connection between the mobile broadband device and the network side is disconnected, only the IPv6 PDP connection remains between the mobile broadband device and the network side. When the IPv4 PDP connection is disconnected, the mobile broadband device releases a stored IPv4 address that is corresponding to the IPv4 PDP connection, and in this case, the mobile broadband device stores only the IPv6 address that is corresponding to the IPv6 PDP connection.

In this step, a reason why the IPv4 PDP connection is disconnected may be that a network signal is weak, or that a user actively cuts off the connection between the mobile broadband device and the network side, or the like.

The first disconnection identifier is used to identify that the IPv4 PDP connection between the mobile broadband device and the network side is disconnected; a word length of the first disconnection identifier may be one byte, two bytes, or the like, and a value of the first disconnection identifier may be 1, 2, or the like; and a specific size and value of the first disconnection identifier are not limited herein.

602: The mobile broadband device sends a disconnection reporting interrupting message to the host, where the disconnection reporting interrupting message carries the first disconnection identifier.

A disconnection identifier field is added to the disconnection reporting interrupting message, and the disconnection identifier field is used to carry the first disconnection identifier.

The host may be a device such as a personal computer that can connect to the network side by using the mobile broadband device, and the host is not limited herein.

603: The host receives the disconnection reporting interrupting message sent by the mobile broadband device, determines a connection state between the mobile broadband device and the network side according to the first disconnection identifier carried in the disconnection reporting interrupting message, and sets a value of a state identifier included in the host to a connection identifier corresponding to the connection state.

The value of the state identifier included in the host is a third connection identifier before a current moment, and according to the state identifier included in the host, it is determined that the mobile broadband device and the network side are in a third connection state before the current moment, where the third connection state is that the IPv4 PDP connection and the IPv6 PDP connection exist between the mobile broadband device and the network side; according to the first disconnection identifier carried in the disconnection reporting interrupting message and the third connection state between the mobile broadband device and the network side before the current moment, it is determined that the mobile broadband device and the network side are in a second connection state at the current moment, and according to this, the value of the state identifier included in the host is set to a second connection identifier corresponding to the second connection state, where the second connection state is that the IPv6 PDP connection exists between the mobile broadband device and the network side.

The host includes a network interface card driver and a host protocol stack, and because the value of the state identifier included in the host is the third connection identifier before the current moment, the network interface card driver determines that the mobile broadband device and the network side are in the third connection state before the current moment; according to the first disconnection identifier carried in the disconnection reporting interrupting message and the third connection state between the mobile broadband device and the network side before the current moment, the network interface card driver determines that the mobile broadband device and the network side are in the second connection state at the current moment, and sets the value of the state identifier included in the host to the second connection identifier corresponding to the second connection state.

604: The host determines that the value of the state identifier included in the host is not an identifier corresponding to a disconnection state, and acquires an IP address of the host.

When the value of the state identifier included in the host changes, the host performs determining on the value of the state identifier. If it is determined that the value of the state identifier is not the identifier corresponding to the disconnection state, the host acquires the IP address of the host and connects to the network side; and if it is determined that the value of the state identifier is the identifier corresponding to the disconnection state, the host disconnects from the network side.

The network interface card driver of the host performs determining on the value of the state identifier included in the host. If it is determined that the value of the state identifier is not the identifier corresponding to the disconnection state, the network interface card driver sends a connection state reporting message to the host protocol stack; after receiving the connection state reporting message sent by the network interface card driver, the host protocol stack sends a query command to the mobile broadband device, receives a query response returned by the mobile broadband device, acquires the IP address of the host carried in the query response, and connects to the network side. If it is determined that the value of the state identifier is the identifier corresponding to the disconnection state, the network interface card driver sends a disconnection state reporting message to the host protocol stack, and the host protocol stack disconnects from the network side.

The identifier corresponding to the disconnection state is used to identify that the mobile broadband device and the network side are in the disconnection state.

In this step, the value of the state identifier included in the host is the second connection identifier, which indicates that the IPv6 PDP connection exists between the mobile broadband device and the network side. The network interface card driver performs determining on the value of the state identifier, and determines that the value of the state identifier is not the identifier corresponding to the disconnection state, and then sends the connection state reporting message to the host protocol stack; after receiving the connection state reporting message sent by the network interface card driver, the host protocol stack sends the query command to the mobile broadband device; the mobile broadband device receives the query command sent by the host protocol stack, acquires the IPv6 address that is corresponding to the IPv6 PDP connection and stored in the mobile broadband device itself, and sends the query response to the host protocol stack, where the query response carries the acquired IPv6 address; and after receiving the query response sent by the mobile broadband device, the host protocol stack acquires the IPv6 address carried in the query response and continues to connect to the IPv6 network. In this case, the host does not acquire the IPv4 address, and disconnects from an IPv4 network.

605: Only the IPv6 PDP connection exists between the mobile broadband device and the network side, and if it is further detected that the IPv6 PDP connection between the mobile broadband device and the network side is disconnected, acquire a second disconnection identifier.

Only the IPv6 PDP connection exists between the mobile broadband device and the network side. When the IPv6 PDP connection between the mobile broadband device and the network side is disconnected, no PDP connection exists between the mobile broadband device and the network side.

When the IPv6 PDP connection is disconnected, the mobile broadband device releases the stored IPv6 address that is corresponding to the IPv6 PDP connection, and in this case, the mobile broadband device stores no IP address.

In this step, a reason why the IPv6 PDP connection is disconnected may be that a network signal is weak, or that the user actively cuts off the connection between the mobile broadband device and the network side, or the like.

The second disconnection identifier is used to identify that the IPv6 PDP connection between the mobile broadband device and the network side is disconnected; a word length of the second disconnection identifier may be one byte, two bytes, or the like, and a value of the second disconnection identifier may be 3, 4, or the like; and a specific size and value of the second disconnection identifier are not limited herein.

606: The mobile broadband device sends a disconnection reporting interrupting message to the host, where the disconnection reporting interrupting message carries the second disconnection identifier.

A disconnection identifier field in the disconnection reporting interrupting message is used to carry the second disconnection identifier.

607: The host receives the disconnection reporting interrupting message sent by the mobile broadband device, determines a connection state between the mobile broadband device and the network side according to the second disconnection identifier carried in the disconnection reporting interrupting message, and sets the value of the state identifier included in the host to a connection identifier corresponding to the connection state.

The value of the state identifier included in the host is the second connection identifier before a current moment, and according to the state identifier included in the host, it is determined that the mobile broadband device and the network side are in the second connection state before the current moment, where the second connection state is that the IPv6 PDP connection exists between the mobile broadband device and the network side; according to the second disconnection identifier carried in the disconnection reporting interrupting message and the second connection state between the mobile broadband device and the network side before the current moment, it is determined that the mobile broadband device and the network side are in the disconnection state at the current moment, and according to this, the value of the state identifier included in the host is set to the identifier corresponding to the disconnection state.

Because the value of the state identifier included in the host is the second connection identifier before the current moment, the network interface card driver of the host determines that the mobile broadband device and the network side are in the second connection state before the current moment; according to the second disconnection identifier carried in the disconnection reporting interrupting message and the second connection state between the mobile broadband device and the network side before the current moment, the network interface card driver determines that the mobile broadband device and the network side are in the disconnection state at the current moment, and sets the value of the state identifier included in the host to the identifier corresponding to the disconnection state.

608: The host determines that the value of the state identifier included in the host is the identifier corresponding to the disconnection state, and disconnects from the network side.

The network interface card driver of the host performs determining on the value of the state identifier included in the host, and determines that the value of the state identifier is the identifier corresponding to the disconnection state.

In this step, the value of the state identifier included in the host is the identifier corresponding to the disconnection state, which indicates that the mobile broadband device and the network side are in the disconnection state. The network interface card driver performs determining on the value of the state identifier, and determines that the value of the state identifier is the identifier corresponding to the disconnection state, and then sends the disconnection state reporting message to the host protocol stack; and after receiving the disconnection state reporting message sent by the network interface card driver, the host protocol stack disconnects from the network side.

In conclusion, according to the method provided in this embodiment of the present invention, a mobile broadband device sends identification information to a host, so that the host sets, according to the identification information, a value of a state identifier included in the host. Values of different state identifiers are corresponding to different connection states between the mobile broadband device and a network side. As long as the value of the state identifier is not an identifier corresponding to a disconnection state, the host queries the mobile broadband device and acquires an IP address; and as long as the value of the state identifier is the identifier corresponding to the disconnection state, the host disconnects from the network side. Compared with the prior art, in this embodiment of the present invention, after the host acquires an IPv4 address and an IPv6 address and one PDP connection of an IPv4 PDP connection and an IPv6 PDP connection between the mobile broadband device and the network side is disconnected, the host may further acquire an IP address corresponding to the other PDP connection and connect to a corresponding network, so that the user can use an available network more effectively.

Embodiment 6

Figure 7:
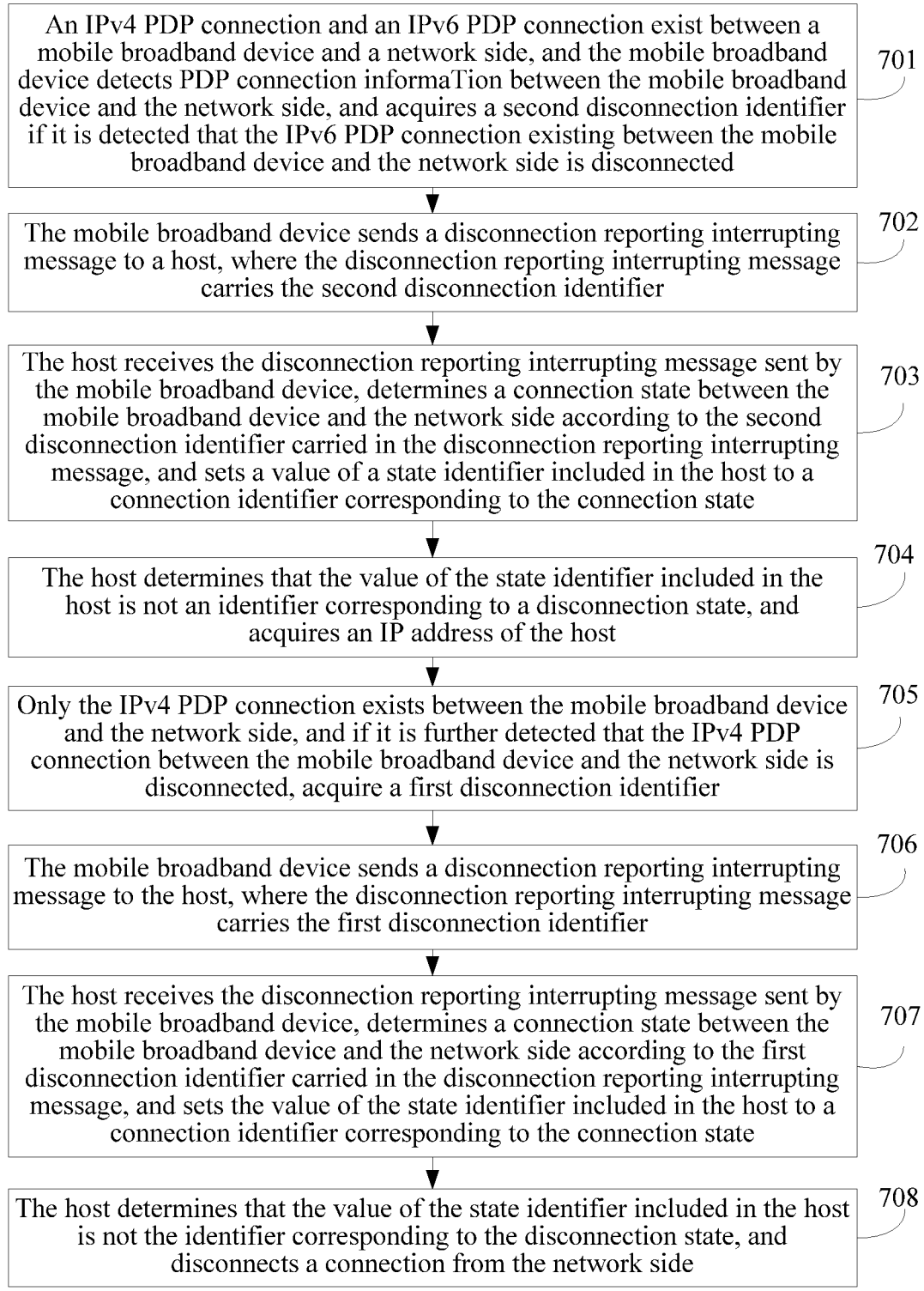
FIG. 7 is a flowchart of a method for acquiring an IP address according to Embodiment 6 of the present invention.

This embodiment of the present invention provides a method for acquiring an IP address. A host is connected to a mobile broadband device, and the mobile broadband device supports an IPv4 and IPv6 dual stack. At first, an IPv4 PDP connection and an IPv6 PDP connection exist between a mobile broadband device and a network side. By using the method in this embodiment, when the IPv6 PDP connection that exists between the mobile broadband device and the network side is disconnected, the host may acquire an IPv4 address corresponding to the IPv4 PDP connection that exists between the mobile broadband device and the network device, and connects to an IPv4 network. When the IPv4 PDP connection that exists between the mobile broadband device and the network device is also disconnected, the host disconnects from the network side. Referring to FIG. 7, the method includes the following steps.

701: An IPv4 PDP connection and an IPv6 PDP connection exist between a mobile broadband device and a network side, and the mobile broadband device detects PDP connection information between the mobile broadband device and the network side, and acquires a second disconnection identifier if it is detected that the IPv6 PDP connection existing between the mobile broadband device and the network side is disconnected.

The mobile broadband device may be a device such as a 3G WAN card or a mobile phone that can provide a wireless network connection function, and the present invention constitutes no specific limitation to the mobile broadband device herein. The IPv4 PDP connection and the IPv6 PDP connection exist between the mobile broadband device and the network side at first. When the IPv6 PDP connection between the mobile broadband device and the network side is disconnected, only the IPv4 PDP connection of the PDP connections remains between the mobile broadband device and the network side. When the IPv6 PDP connection is disconnected, the mobile broadband device releases a stored IPv6 address that is corresponding to the IPv6 PDP connection, and in this case, the mobile broadband device stores only the IPv4 address that is corresponding to the IPv4 PDP connection.

In this step, a reason why the IPv6 PDP connection is disconnected may be that a network signal is weak, or that a user actively cuts off the connection between the mobile broadband device and the network side, or the like.

The second disconnection identifier is used to identify that the IPv6 PDP connection between the mobile broadband device and the network side is disconnected; a word length of the second disconnection identifier may be one byte, two bytes, or the like, and a value of the second disconnection identifier may be 3, 4, or the like; and a specific size and value of the second disconnection identifier are not limited herein.

702: The mobile broadband device sends a disconnection reporting interrupting message to the host, where the disconnection reporting interrupting message carries the second disconnection identifier.

A disconnection identifier field is added to the disconnection reporting interrupting message, and the disconnection identifier field is used to carry the second disconnection identifier.

The host may be a device such as a personal computer that can connect to the network side by using the mobile broadband device, and the host is not limited herein.

703: The host receives the disconnection reporting interrupting message sent by the mobile broadband device, determines a connection state between the mobile broadband device and the network side according to the second disconnection identifier carried in the disconnection reporting interrupting message, and sets a value of a state identifier included in the host to a connection identifier corresponding to the connection state.

The value of the state identifier included in the host is a third connection identifier before a current moment, and according to the state identifier included in the host, it is determined that the mobile broadband device and the network side are in a third connection state before the current moment, where the third connection state is that the IPv4 PDP connection and the IPv6 PDP connection exist between the mobile broadband device and the network side; according to the second disconnection identifier carried in the disconnection reporting interrupting message and the third connection state between the mobile broadband device and the network side before the current moment, it is determined that the mobile broadband device and the network side are in a first connection state at the current moment, and according to this, the value of the state identifier included in the host is set to a first connection identifier corresponding to the first connection state, where the first connection state is that the IPv4 PDP connection exists between the mobile broadband device and the network side.

The host includes a network interface card driver and a host protocol stack, and because the value of the state identifier included in the host is the third connection identifier before the current moment, the network interface card driver determines that the mobile broadband device and the network side are in the third connection state before the current moment; according to the second disconnection identifier carried in the disconnection reporting interrupting message and the third connection state between the mobile broadband device and the network side before the current moment, the network interface card driver determines that the mobile broadband device and the network side are in the first connection state at the current moment, and sets the value of the state identifier included in the host to the first connection identifier corresponding to the first connection state.

704: The host determines that the value of the state identifier included in the host is not an identifier corresponding to a disconnection state, and acquires an IP address of the host.

When the value of the state identifier included in the host changes, the host performs determining on the value of the state identifier. If it is determined that the value of the state identifier is not the identifier corresponding to the disconnection state, the host acquires the IP address of the host and connects to the network side; and if it is determined that the value of the state identifier is the identifier corresponding to the disconnection state, the host disconnects from the network side.

The network interface card driver of the host performs determining on the value of the state identifier included in the host. If it is determined that the value of the state identifier is not the identifier corresponding to the disconnection state, the network interface card driver sends a connection state reporting message to the host protocol stack; after receiving the connection state reporting message sent by the network interface card driver, the host protocol stack sends a query command to the mobile broadband device, receives a query response returned by the mobile broadband device, acquires the IP address of the host carried in the query response, and connects to the network side. If it is determined that the value of the state identifier is the identifier corresponding to the disconnection state, the network interface card driver sends a disconnection state reporting message to the host protocol stack, and the host protocol stack disconnects from the network side.

The identifier corresponding to the disconnection state is used to identify that the mobile broadband device and the network side are in the disconnection state.

In this step, the value of the state identifier included in the host is the first connection identifier, which indicates that the IPv4 PDP connection exists between the mobile broadband device and the network side. The network interface card driver performs determining on the value of the state identifier, and determines that the value of the state identifier is not the identifier corresponding to the disconnection state, and then sends the connection state reporting message to the host protocol stack; after receiving the connection state reporting message sent by the network interface card driver, the host protocol stack sends the query command to the mobile broadband device; the mobile broadband device receives the query command sent by the host protocol stack, acquires the IPv4 address that is corresponding to the IPv4 PDP connection and stored in the mobile broadband device, and sends the query response to the host protocol stack, where the query response carries the acquired IPv4 address; and after receiving the query response sent by the mobile broadband device, the host protocol stack acquires the IPv4 address carried in the query response and continues to connect to the IPv4 network. In this case, the host does not acquire the IPv6 address, and disconnects from an IPv6 network.

705: Only the IPv4 PDP connection exists between the mobile broadband device and the network side, and if it is further detected that the IPv4 PDP connection between the mobile broadband device and the network side is disconnected, acquire a first disconnection identifier.

Only the IPv4 PDP connection exists between the mobile broadband device and the network side. When the IPv4 PDP connection between the mobile broadband device and the network side is disconnected, no PDP connection exists between the mobile broadband device and the network side.

When the IPv4 PDP connection is disconnected, the mobile broadband device releases the stored IPv4 address that is corresponding to the IPv4 PDP connection, and in this case, the mobile broadband device stores no IP address.

In this step, a reason why the IPv4 PDP connection is disconnected may be that a network signal is weak, or that the user actively cuts off the connection between the mobile broadband device and the network side, or the like.

The first disconnection identifier is used to identify that the IPv4 PDP connection between the mobile broadband device and the network side is disconnected; a word length of the first disconnection identifier may be one byte, two bytes, or the like, and a value of the first disconnection identifier may be 1, 2, or the like; and a specific size and value of the first disconnection identifier are not limited herein.

706: The mobile broadband device sends a disconnection reporting interrupting message to the host, where the disconnection reporting interrupting message carries the first disconnection identifier.

A disconnection identifier field in the disconnection reporting interrupting message is used to carry the first disconnection identifier.

707: The host receives the disconnection reporting interrupting message sent by the mobile broadband device, determines a connection state between the mobile broadband device and the network side according to the first disconnection identifier carried in the disconnection reporting interrupting message, and sets the value of the state identifier included in the host to a connection identifier corresponding to the connection state.

The value of the state identifier included in the host is the first connection identifier before a current moment, and according to the state identifier included in the host, it is determined that the mobile broadband device and the network side are in the first connection state before the current moment, where the first connection state is that the IPv4 PDP connection exists between the mobile broadband device and the network side; according to the first disconnection identifier carried in the disconnection reporting interrupting message and the first connection state between the mobile broadband device and the network side before the current moment, it is determined that the mobile broadband device and the network side are in the disconnection state at the current moment, and according to this, the value of the state identifier included in the host is set to the identifier corresponding to the disconnection state.

Because the value of the state identifier included in the host is the first connection identifier before the current moment, the network interface card driver determines that the mobile broadband device and the network side are in the first connection state before the current moment; according to the first disconnection identifier carried in the disconnection reporting interrupting message and the first connection state between the mobile broadband device and the network side before the current moment, the network interface card driver determines that the mobile broadband device and the network side are in the disconnection state at the current moment, and sets the value of the state identifier included in the host to the identifier corresponding to the disconnection state.

708: The host determines that the value of the state identifier included in the host is the identifier corresponding to the disconnection state, and disconnects from the network side.

The network interface card driver of the host performs determining on the value of the state identifier included in the host, and determines that the value of the state identifier is the identifier corresponding to the disconnection state.

In this step, the value of the state identifier included in the host is the identifier corresponding to the disconnection state, which indicates that the mobile broadband device and the network side are in the disconnection state. The network interface card driver performs determining on the value of the state identifier, and determines that the value of the state identifier is the identifier corresponding to the disconnection state, and then sends the disconnection state reporting message to the host protocol stack; and after receiving the disconnection state reporting message sent by the network interface card driver, the host protocol stack disconnects from the network side.

Figure 8:
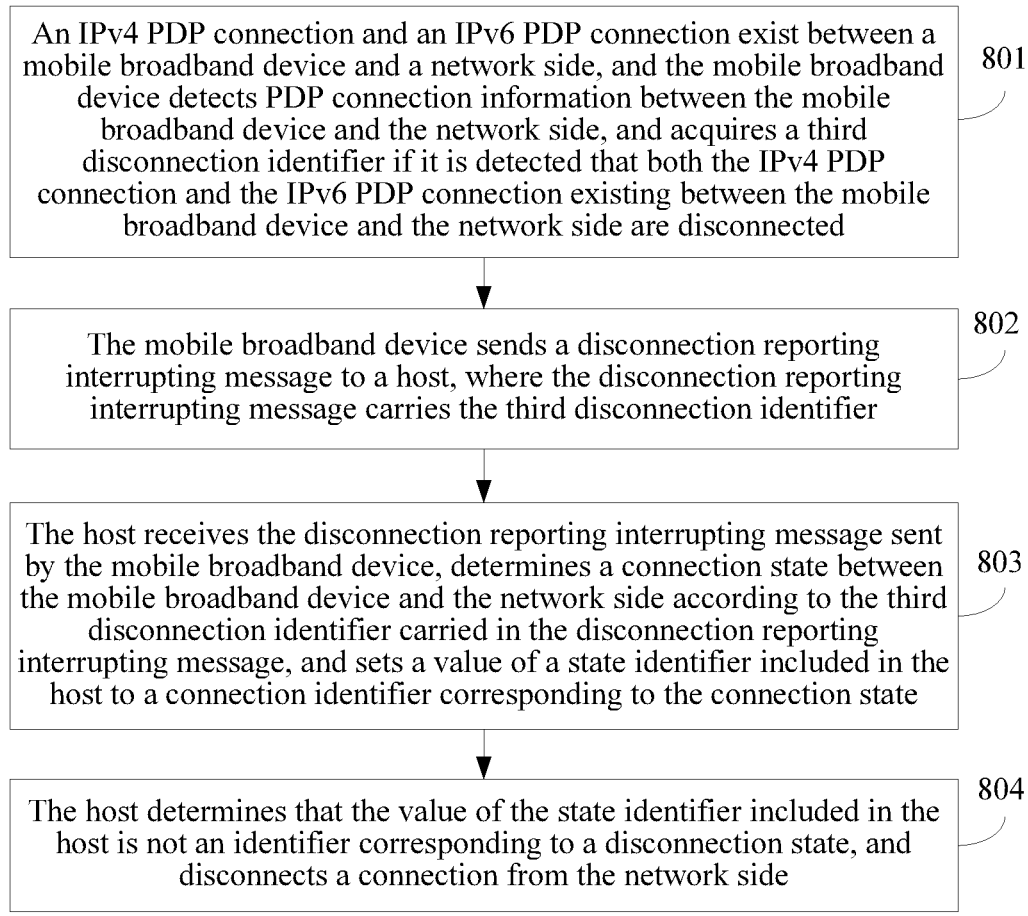
FIG. 8 is a flowchart of another method for acquiring an IP address according to Embodiment 6 of the present invention.

In the methods of Embodiment 5 and Embodiment 6, if the mobile broadband device detects that both the IPv4 PDP connection and the IPv4 PDP connection between the mobile broadband device and the network side are disconnected, the host disconnects from the network side. Referring to FIG. 8, the steps to be performed are as follows.

801: An IPv4 PDP connection and an IPv6 PDP connection exist between a mobile broadband device and a network side, and the mobile broadband device detects PDP connection information between the mobile broadband device and the network side, and acquires a third disconnection identifier if it is detected that both the IPv4 PDP connection and the IPv6 PDP connection existing between the mobile broadband device and the network side are disconnected.

The IPv4 PDP connection and the IPv6 PDP connection exist between the mobile broadband device and the network side at first. When both the IPv4 PDP connection and the IPv6 PDP connection between the mobile broadband device and the network side are disconnected, no PDP connection exists between the mobile broadband device and the network side. When both the IPv4 PDP connection and the IPv6 PDP connection are disconnected, the mobile broadband device releases the stored IPv4 address that is corresponding to the IPv6 PDP connection and the stored IPv6 address that is corresponding to the IPv6 PDP connection, and in this case, the mobile broadband device stores no IP address.

In this step, a reason why both the IPv4 PDP connection and the IPv6 PDP connection are disconnected may be that a network signal is weak, or that a user actively cuts off the connection between the mobile broadband device and the network side, or the like.

The third disconnection identifier is used to identify that both the IPv4 PDP connection and the IPv6 PDP connection between the mobile broadband device and the network side are disconnected; a word length of the third disconnection identifier may be one byte, two bytes, or the like, and a value of the third disconnection identifier may be 5, 6, or the like; and a specific size and value of the first disconnection identifier are not limited herein.

802: The mobile broadband device sends a disconnection reporting interrupting message to the host, where the disconnection reporting interrupting message carries the third disconnection identifier.

A disconnection identifier field in the disconnection reporting interrupting message is used to carry the third disconnection identifier.

803: The host receives the disconnection reporting interrupting message sent by the mobile broadband device, determines a connection state between the mobile broadband device and the network side according to the third disconnection identifier carried in the disconnection reporting interrupting message, and sets the value of the state identifier included in the host to a connection identifier corresponding to the connection state.

According to the third disconnection identifier carried in the disconnection reporting interrupting message, it is determined that the mobile broadband device and the network side are in the disconnection state, and according to this, the value of the state identifier included in the host is set to the identifier corresponding to the disconnection state.

The host includes the network interface card driver and the host protocol stack. According to the third disconnection identifier carried in the disconnection reporting interrupting message, the network interface card driver determines that the mobile broadband device and the network side are in the disconnection state, and sets the value of the state identifier included in the host to the identifier corresponding to the disconnection state.

804: The host determines that the value of the state identifier included in the host is the identifier corresponding to the disconnection state, and disconnects from the network side.

The network interface card driver of the host performs determining on the value of the state identifier included in the host, and determines that the value of the state identifier is the identifier corresponding to the disconnection state.

In this step, the value of the state identifier included in the host is the identifier corresponding to the disconnection state, which indicates that the mobile broadband device and the network side are in the disconnection state. The network interface card driver performs determining on the value of the state identifier, and determines that the value of the state identifier is the identifier corresponding to the disconnection state, and then sends the disconnection state reporting message to the host protocol stack; and after receiving the disconnection state reporting message sent by the network interface card driver, the host protocol stack disconnects from the network side.

In conclusion, according to the method provided in this embodiment of the present invention, a mobile broadband device sends identification information to a host, so that the host sets, according to the identification information, a value of a state identifier included in the host. Values of different state identifiers are corresponding to different connection states between the mobile broadband device and a network side. As long as the value of the state identifier is not an identifier corresponding to a disconnection state, the host queries the mobile broadband device and acquires an IP address; and as long as the value of the state identifier is the identifier corresponding to the disconnection state, the host disconnects from the network side. Compared with the prior art, in this embodiment of the present invention, after the host acquires an IPv4 address and an IPv6 address and one PDP connection of an IPv4 PDP connection and an IPv6 PDP connection between the mobile broadband device and the network side is disconnected, the host may further acquire an IP address corresponding to the other PDP connection and connect to a corresponding network, so that the user can use an available network more effectively.

Embodiment 7

Figure 9:
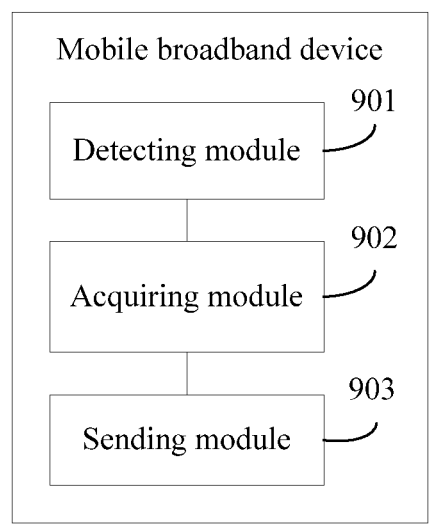
FIG. 9 is a schematic structural diagram of a mobile broadband device according to Embodiment 7 of the present invention.

This embodiment of the present invention provides a mobile broadband device, and the mobile broadband device is configured to perform the method for acquiring an IP address according to any one of Embodiments 1 to 6. Referring to FIG. 9, the mobile broadband device includes a detecting module 901 configured to detect PDP connection information between a mobile broadband device and a network side; an acquiring module 902 configured to acquire identification information if the detecting module 901 detects that the PDP connection information between the mobile broadband device and the network side changes, where the identification information is used to identify the PDP connection information between the mobile broadband device and the network side; and a sending module 903 configured to send the identification information acquired by the acquiring module 902 to a host, so that the host acquires an IP address of the host according to the identification information.

The acquiring module 902 is configured to, if the detecting module 901 detects that a PDP connection is established between the mobile broadband device and the network side, determine that the mobile broadband device and the network side are in a connection state, and acquire a connection identifier corresponding to the connection state.

Correspondingly, the sending module 903 is configured to send a connection reporting interrupting message to the host, where the connection reporting interrupting message carries the connection identifier that is corresponding to the connection state and acquired by the acquiring module 902.

Figure 10:
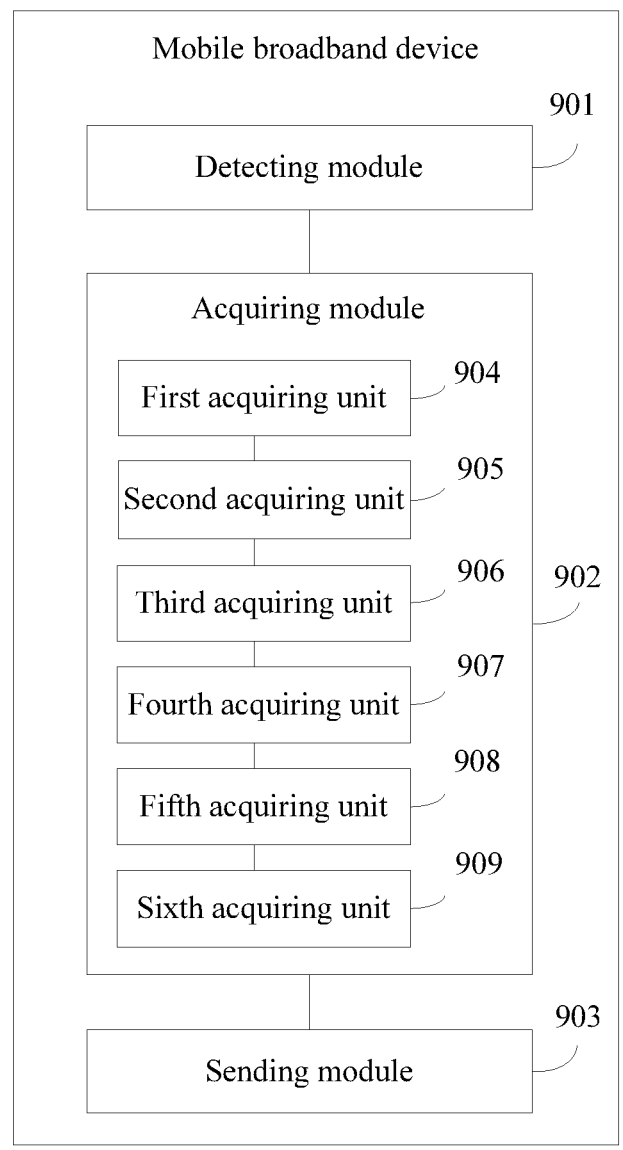
FIG. 10 is a schematic structural diagram of another mobile broadband device according to Embodiment 7 of the present invention.

Referring to FIG. 10, the acquiring module 902 includes a first acquiring unit 904 configured to, if the detecting module 901 detects that an IPv4 PDP connection is established between the mobile broadband device and the network side and that an IPv6 PDP connection does not exist between the mobile broadband device and the network side, determine that the mobile broadband device and the network side are in a first connection state, and acquire a first connection identifier corresponding to the first connection state; a second acquiring unit 905 configured to, if the detecting module 901 detects that the IPv6 PDP connection is established between the mobile broadband device and the network side and the IPv4 PDP connection does not exist between the mobile broadband device and the network side, determine that the mobile broadband device and the network side are in a second connection state, and acquire a second connection identifier corresponding to the second connection state; and a third acquiring unit 906 configured to, if the detecting module 901 detects that the IPv6 PDP connection is established between the mobile broadband device and the network side after the IPv4 PDP connection exists between the mobile broadband device and the network side, or the detecting module 901 detects that the IPv4 PDP connection is established between the mobile broadband device and the network side after the IPv6 PDP connection exists between the mobile broadband device and the network side, determine that the mobile broadband device and the network side are in a third connection state, and acquire a third connection identifier corresponding to the third connection state.

The acquiring module 902 is configured to acquire a disconnection identifier if the detecting module 901 detects that a PDP connection existing between the mobile broadband device and the network side is disconnected, where the disconnection identifier is used to identify that the PDP connection between the mobile broadband device and the network side is disconnected.

Correspondingly, the sending module 903 is configured to send a disconnection reporting interrupting message to the host, where the disconnection reporting interrupting message carries the disconnection identifier acquired by the acquiring module 902.

Referring to FIG. 10, the acquiring module 902 further includes a fourth acquiring unit 907 configured to acquire a first disconnection identifier if the detecting module 901 detects that the IPv4 PDP connection existing between the mobile broadband device and the network side is disconnected, where the first disconnection identifier is used to identify that the IPv4 PDP connection between the mobile broadband device and the network side is disconnected; a fifth acquiring unit 908 configured to acquire a second disconnection identifier if the detecting module 901 detects that the IPv6 PDP connection existing between the mobile broadband device and the network side is disconnected, where the second disconnection identifier is used to identify that the IPv6 PDP connection between the mobile broadband device and the network side is disconnected; and a sixth acquiring unit 909 configured to acquire a third disconnection identifier if the detecting module 901 detects that both the IPv4 PDP connection and the IPv6 PDP connection that exist between the mobile broadband device and the network side are disconnected, where the third disconnection identifier is used to identify that both the IPv4 PDP connection and the IPv6 PDP connection between the mobile broadband device and the network side are disconnected.

In conclusion, according to this embodiment of the present invention, a mobile broadband device sends identification information to a host, so that the host sets, according to the identification information, a value of a state identifier included in the host. Values of different state identifiers are corresponding to different connection states between the mobile broadband device and a network side. As long as the value of the state identifier is not an identifier corresponding to a disconnection state, the host queries the mobile broadband device and acquires an IP address; and as long as the value of the state identifier is the identifier corresponding to the disconnection state, the host disconnects from the network side. Compared with the prior art, in this embodiment of the present invention, regardless of a sequence of or a time interval between establishment of an IPv4 PDP connection and an IPv6 PDP connection by the mobile broadband device, a network does not need to be disconnected in a process in which the host acquires an IPv4 address and an IPv6 address, so that a data service of a user is not interrupted. In addition, after the host acquires the IPv4 address and the IPv6 address and one PDP connection of the IPv4 PDP connection and the IPv6 PDP connection between the mobile broadband device and the network side is disconnected, the host may further acquire an IP address corresponding to the other PDP connection and connect to a corresponding network, so that the user can use an available network more effectively.

Embodiment 8

Figure 11:
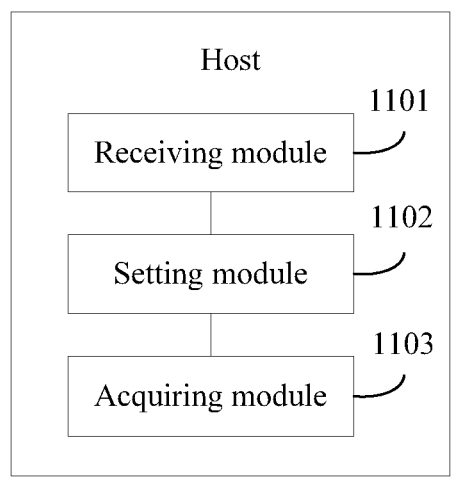
FIG. 11 is a schematic structural diagram of a host according to Embodiment 8 of the present invention.

This embodiment of the present invention provides a host, and the host is configured to perform the method for acquiring an IP address according to any one of Embodiments 1 to 6. Referring to FIG. 11, the host includes a receiving module 1101 configured to receive identification information sent by a mobile broadband device, where the identification information is used to identify PDP connection information between the mobile broadband device and a network side; a setting module 1102 configured to set, according to the identification information received by the receiving module 1101, a value of a state identifier included in the host; and an acquiring module 1103 configured to acquire an IP address of the host if the value that is of the state identifier and set by the setting module 1102 is not an identifier corresponding to a disconnection state.

The receiving module 1101 is configured to receive a connection reporting interrupting message sent by the mobile broadband device, where the connection reporting interrupting message carries a connection identifier corresponding to a connection state between the mobile broadband device and the network side.

Correspondingly, the setting module 1102 is configured to set the value of the state identifier included in the host to the connection identifier corresponding to the connection state between the mobile broadband device and the network side.

Figure 12:
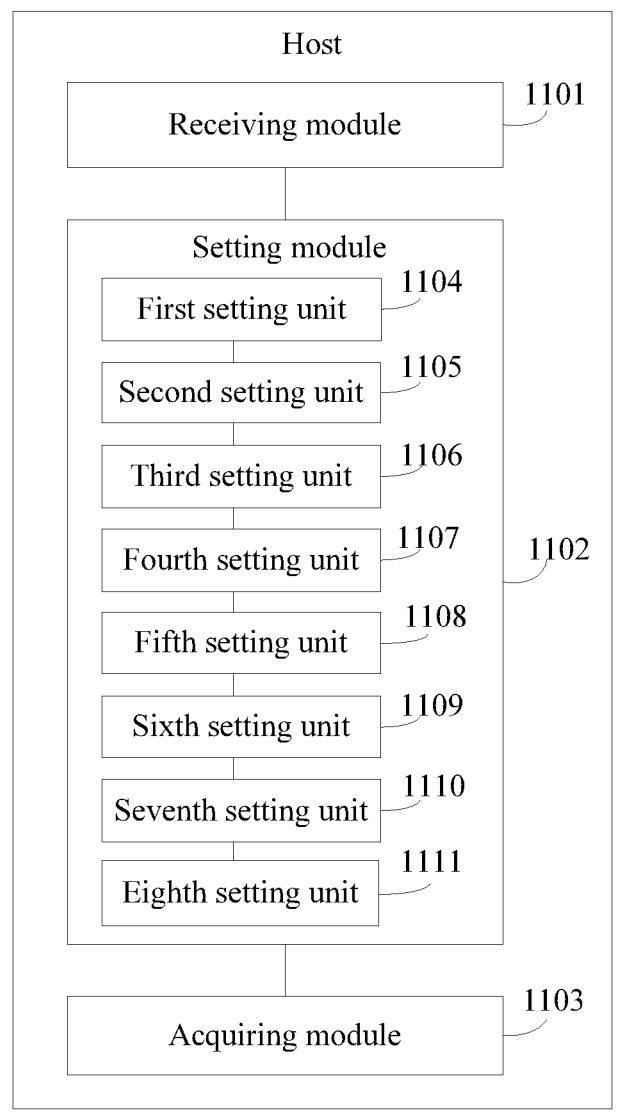
FIG. 12 is a schematic structural diagram of another host according to Embodiment 8 of the present invention.

Referring to FIG. 12, the setting module 1102 includes a first setting unit 1104 configured to, if the connection state between the mobile broadband device and the network side is a first connection state, set the value of the state identifier included in the host to a first connection identifier corresponding to the first connection state, where the first connection state is that an IPv4 PDP connection exists between the mobile broadband device and the network side; a second setting unit 1105 configured to, if the connection state between the mobile broadband device and the network side is a second connection state, set the value of the state identifier included in the host to a second connection identifier corresponding to the second connection state, where the second connection state is that an IPv6 PDP connection exists between the mobile broadband device and the network side; and a third setting unit 1106 configured to, if the connection state between the mobile broadband device and the network side is a third connection state, set the value of the state identifier included in the host to a third connection identifier corresponding to the third connection state, where the third connection state is that an IPv4 PDP connection and an IPv6 PDP connection exist between the mobile broadband device and the network side.

The receiving module 1101 is configured to receive a disconnection reporting interrupting message sent by the mobile broadband device, where the disconnection reporting interrupting message carries a disconnection identifier, and the disconnection identifier is used to identify that a PDP connection between the mobile broadband device and the network side is disconnected.

Correspondingly, the setting module 1102 is configured to determine a connection state between the mobile broadband device and the network side according to the disconnection identifier received by the receiving module 1101, and set the value of the state identifier included in the host to a connection identifier corresponding to the connection state.

If the disconnection identifier received by the receiving module 1101 is a first disconnection identifier, and the first disconnection identifier is used to identify that an IPv4 PDP connection between the mobile broadband device and the network side is disconnected. As shown in FIG. 12, the setting module 1102 further includes a fourth setting unit 1107 configured to, if the value of the state identifier included in the host is the first connection identifier, determine, according to the state identifier included in the host, that the mobile broadband device and the network side are in the first connection state before a current moment, where the first connection state is that the IPv4 PDP connection exists between the mobile broadband device and the network side; according to the first disconnection identifier received by the receiving module 1101 and the first connection state between the mobile broadband device and the network side before the current moment, determine that the mobile broadband device and the network side are in the disconnection state at the current moment, and set the value of the state identifier included in the host to an identifier corresponding to the disconnection state; and a fifth setting unit 1108 configured to, if the value of the state identifier included in the host is the third connection identifier, determine, according to the state identifier included in the host, that the mobile broadband device and the network side are in the third connection state before a current moment, where the third connection state is that the IPv4 PDP connection and an IPv6 PDP connection exist between the mobile broadband device and the network side; according to the first disconnection identifier received by the receiving module 1101 and the third connection state between the mobile broadband device and the network side before the current moment, determine that the mobile broadband device and the network side are in the second connection state at the current moment, and set the value of the state identifier included in the host to the second connection identifier corresponding to the second connection state, where the second connection state is that the IPv6 PDP connection exists between the mobile broadband device and the network side.

If the disconnection identifier received by the receiving module 1101 is a second disconnection identifier, and the second disconnection identifier is used to identify that an IPv6 PDP connection between the mobile broadband device and the network side is disconnected. As shown in FIG. 12, the setting module 1102 further includes a sixth setting unit 1109 configured to, if the value of the state identifier included in the host is the second connection identifier, determine, according to the state identifier included in the host, that the mobile broadband device and the network side are in the second connection state before a current moment, where the second connection state is that the IPv6 PDP connection exists between the mobile broadband device and the network side; according to the second disconnection identifier received by the receiving module 1101 and the second connection state between the mobile broadband device and the network side before the current moment, determine that the mobile broadband device and the network side are in the disconnection state at the current moment, and set the value of the state identifier included in the host to the identifier corresponding to the disconnection state; and a seventh setting unit 1110 configured to, if the value of the state identifier included in the host is the third connection identifier, determine, according to the state identifier included in the host, that the mobile broadband device and the network side are in the third connection state before the current moment, where the third connection state is that an IPv4 PDP connection and the IPv6 PDP connection exist between the mobile broadband device and the network side; according to the second disconnection identifier received by the receiving module 1101 and the third connection state between the mobile broadband device and the network side before the current moment, determine that the mobile broadband device and the network side are in the first connection state at the current moment, and set the value of the state identifier included in the host to the first connection identifier corresponding to the first connection state, where the first connection state is that the IPv4 PDP connection exists between the mobile broadband device and the network side.

If the disconnection identifier received by the receiving module 1101 is a third disconnection identifier, and the third disconnection identifier is used to identify that both an IPv4 PDP connection and an IPv6 PDP connection between the mobile broadband device and the network side are disconnected. As shown in FIG. 12, the setting module 1102 further includes an eighth setting unit 1111 configured to determine, according to the third disconnection identifier received by the receiving module 1101, that the mobile broadband device and the network side are in the disconnection state at a current moment, and set the value of the state identifier included in the host to the identifier corresponding to the disconnection state.

In conclusion, according to the method provided in this embodiment of the present invention, a mobile broadband device sends identification information to a host, so that the host sets, according to the identification information, a value of a state identifier included in the host. Values of different state identifiers are corresponding to different connection states between the mobile broadband device and a network side. As long as the value of the state identifier is not an identifier corresponding to a disconnection state, the host queries the mobile broadband device and acquires an IP address; and as long as the value of the state identifier is the identifier corresponding to the disconnection state, the host disconnects from the network side. Compared with the prior art, in this embodiment of the present invention, regardless of a sequence of or a time interval between establishment of an IPv4 PDP connection and an IPv6 PDP connection by the mobile broadband device, a network does not need to be disconnected in a process in which the host acquires an IPv4 address and an IPv6 address, so that a data service of a user is not interrupted. In addition, after the host acquires the IPv4 address and the IPv6 address and one PDP connection of the IPv4 PDP connection and the IPv6 PDP connection between the mobile broadband device and the network side is disconnected, the host may further acquire an IP address corresponding to the other PDP connection and connect to a corresponding network, so that the user can use an available network more effectively.

Embodiment 9

Figure 13:
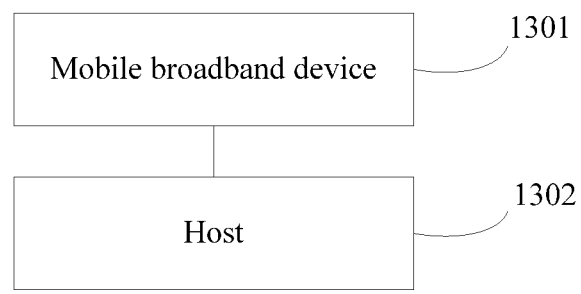
FIG. 13 is a schematic structural diagram of a system for acquiring an IP address according to Embodiment 9 of the present invention.

This embodiment of the present invention provides a system for acquiring an IP address. Referring to FIG. 13, the system includes a mobile broadband device 1301 and a host 1302.

The mobile broadband device 1301 is the mobile broadband device provided in Embodiment 7; and the host 1302 is the host provided in Embodiment 8.

The foregoing system can perform the method in any one of the foregoing method embodiments, and for a detailed process, refer to the description of the method embodiments.

In conclusion, according to the method provided in this embodiment of the present invention, a mobile broadband device sends identification information to a host, so that the host sets, according to the identification information, a value of a state identifier included in the host. Values of different state identifiers are corresponding to different connection states between the mobile broadband device and a network side. As long as the value of the state identifier is not an identifier corresponding to a disconnection state, the host queries the mobile broadband device and acquires an IP address; and as long as the value of the state identifier is the identifier corresponding to the disconnection state, the host disconnects from the network side. Compared with the prior art, in this embodiment of the present invention, regardless of a sequence of or a time interval between establishment of an IPv4 PDP connection and an IPv6 PDP connection by the mobile broadband device, a network does not need to be disconnected in a process in which the host acquires an IPv4 address and an IPv6 address, so that a data service of a user is not interrupted. In addition, after the host acquires the IPv4 address and the IPv6 address and one PDP connection of the IPv4 PDP connection and the IPv6 PDP connection between the mobile broadband device and the network side is disconnected, the host may further acquire an IP address corresponding to the other PDP connection and connect to a corresponding network, so that the user can use an available network more effectively.

Embodiment 10

This embodiment of the present invention provides a mobile broadband device, and the mobile broadband device includes a processor and a memory, and is configured to implement the following method for acquiring an IP address: detecting PDP connection information between the mobile broadband device and a network side; acquiring identification information if it is detected that the PDP connection information between the mobile broadband device and the network side changes, where the identification information is used to identify the PDP connection information between the mobile broadband device and the network side; and sending the identification information to a host, so that the host acquires an IP address of the host according to the identification information.

The acquiring identification information if it is detected that the PDP connection information between the mobile broadband device and the network side changes, includes determining, if it is detected that a PDP connection is established between the mobile broadband device and the network side, that the mobile broadband device and the network side are in a connection state, and acquiring a connection identifier corresponding to the connection state.

Correspondingly, the sending the identification information to a host includes sending a connection reporting interrupting message to the host, where the connection reporting interrupting message carries the connection identifier corresponding to the connection state.

The determining, if it is detected that a PDP connection is established between the mobile broadband device and the network side, that the mobile broadband device and the network side are in a connection state, and acquiring a connection identifier corresponding to the connection state, includes, if it is detected that an IPv4 PDP connection is established between the mobile broadband device and the network side and that an IPv6 PDP connection does not exist between the mobile broadband device and the network side, determining that the mobile broadband device and the network side are in a first connection state, and acquiring a first connection identifier corresponding to the first connection state; if it is detected that an IPv6 PDP connection is established between the mobile broadband device and the network side and that an IPv4 PDP connection does not exist between the mobile broadband device and the network side, determining that the mobile broadband device and the network side are in a second connection state, and acquiring a second connection identifier corresponding to the second connection state; or if after an IPv4 PDP connection exists between the mobile broadband device and the network side, it is detected that an IPv6 PDP connection is established between the mobile broadband device and the network side, or after an IPv6 PDP connection exists between the mobile broadband device and the network side, it is detected that an IPv4 PDP connection is established between the mobile broadband device and the network side, determining that the mobile broadband device and the network side are in a third connection state, and acquiring a third connection identifier corresponding to the third connection state.

The acquiring identification information if it is detected that the PDP connection information between the mobile broadband device and the network side changes, includes acquiring a disconnection identifier if it is detected that a PDP connection existing between the mobile broadband device and the network side is disconnected, where the disconnection identifier is used to identify that the PDP connection between the mobile broadband device and the network side is disconnected.

Correspondingly, the sending the identification information to a host includes sending a disconnection reporting interrupting message to the host, where the disconnection reporting interrupting message carries the disconnection identifier.

The acquiring a disconnection identifier if it is detected that a PDP connection existing between the mobile broadband device and the network side is disconnected, includes acquiring a first disconnection identifier if it is detected that an IPv4 PDP connection existing between the mobile broadband device and the network side is disconnected, where the first disconnection identifier is used to identify that the IPv4 PDP connection between the mobile broadband device and the network side is disconnected; acquiring a second disconnection identifier if it is detected that an IPv6 PDP connection existing between the mobile broadband device and the network side is disconnected, where the second disconnection identifier is used to identify that the IPv6 PDP connection between the mobile broadband device and the network side is disconnected; or acquiring a third disconnection identifier if it is detected that both an IPv4 PDP connection and an IPv6 PDP connection existing between the mobile broadband device and the network side are disconnected, where the third disconnection identifier is used to identify that both the IPv4 PDP connection and the IPv6 PDP connection between the mobile broadband device and the network side are disconnected.

In conclusion, according to the method provided in this embodiment of the present invention, a mobile broadband device sends identification information to a host, so that the host sets, according to the identification information, a value of a state identifier included in the host. Values of different state identifiers are corresponding to different connection states between the mobile broadband device and a network side. As long as the value of the state identifier is not an identifier corresponding to a disconnection state, the host queries the mobile broadband device and acquires an IP address; and as long as the value of the state identifier is the identifier corresponding to the disconnection state, the host disconnects from the network side. Compared with the prior art, in this embodiment of the present invention, regardless of a sequence of or a time interval between establishment of an IPv4 PDP connection and an IPv6 PDP connection by the mobile broadband device, a network does not need to be disconnected in a process in which the host acquires an IPv4 address and an IPv6 address, so that a data service of a user is not interrupted. In addition, after the host acquires the IPv4 address and the IPv6 address and one PDP connection of the IPv4 PDP connection and the IPv6 PDP connection between the mobile broadband device and the network side is disconnected, the host may further acquire an IP address corresponding to the other PDP connection and connect to a corresponding network, so that the user can use an available network more effectively.

Embodiment 11

This embodiment of the present invention provides a host, and the host includes a processor and a memory, and is configured to implement the following method for acquiring an IP address: receiving identification information sent by a mobile broadband device, where the identification information is used to identify PDP connection information between the mobile broadband device and a network side; setting, according to the identification information, a value of a state identifier included in a host; and acquiring an IP address of the host if the value of the state identifier is not an identifier corresponding to a disconnection state.

The receiving identification information sent by a mobile broadband device includes receiving a connection reporting interrupting message sent by the mobile broadband device, where the connection reporting interrupting message carries a connection identifier corresponding to a connection state between the mobile broadband device and the network side.

Correspondingly, the setting, according to the identification information, a value of a state identifier included in a host includes setting the value of the state identifier included in the host to the connection identifier corresponding to the connection state between the mobile broadband device and the network side.

The setting the value of the state identifier included in the host to the connection identifier corresponding to the connection state of the mobile broadband device and the network side includes, if the connection state between the mobile broadband device and the network side is a first connection state, setting the value of the state identifier included in the host to a first connection identifier corresponding to the first connection state, where the first connection state is that an IPv4 PDP connection exists between the mobile broadband device and the network side; if the connection state between the mobile broadband device and the network side is a second connection state, setting the value of the state identifier included in the host to a second connection identifier corresponding to the second connection state, where the second connection state is that an IPv6 PDP connection exists between the mobile broadband device and the network side; or if the connection state between the mobile broadband device and the network side is a third connection state, setting the value of the state identifier included in the host to a third connection identifier corresponding to the third connection state, where the third connection state is that an IPv4 PDP connection and an IPv6 PDP connection exist between the mobile broadband device and the network side.

The receiving identification information sent by a mobile broadband device includes receiving a disconnection reporting interrupting message sent by the mobile broadband device, where the disconnection reporting interrupting message carries a disconnection identifier, and the disconnection identifier is used to identify that a PDP connection between the mobile broadband device and the network side is disconnected.

Correspondingly, the setting, according to the identification information, a value of a state identifier included in a host includes determining a connection state between the mobile broadband device and the network side according to the disconnection identifier, and setting the value of the state identifier included in the host to a connection identifier corresponding to the connection state.

If the disconnection identifier is a first disconnection identifier, and the first disconnection identifier is used to identify that an IPv4 PDP connection between the mobile broadband device and the network side is disconnected, the determining a connection state between the mobile broadband device and the network side according to the disconnection identifier, and setting the value of the state identifier included in the host to a connection identifier corresponding to the connection state includes, if the value of the state identifier included in the host is a first connection identifier, determining, according to the state identifier included in the host, that the mobile broadband device and the network side are in a first connection state before a current moment, where the first connection state is that the IPv4 PDP connection exists between the mobile broadband device and the network side; determining, according to the first disconnection identifier and the first connection state between the mobile broadband device and the network side before the current moment, that the mobile broadband device and the network side are in the disconnection state at the current moment, and setting the value of the state identifier included in the host to the identifier corresponding to the disconnection state; and if the value of the state identifier included in the host is a third connection identifier, determining, according to the state identifier included in the host, that the mobile broadband device and the network side are in a third connection state before a current moment, where the third connection state is that the IPv4 PDP connection and an IPv6 PDP connection exist between the mobile broadband device and the network side; determining, according to the first disconnection identifier and the third connection state between the mobile broadband device and the network side before the current moment, that the mobile broadband device and the network side are in a second connection state at the current moment, and setting the value of the state identifier included in the host to a second connection identifier corresponding to the second connection state, where the second connection state is that the IPv6 PDP connection exists between the mobile broadband device and the network side.

If the disconnection identifier is a second disconnection identifier, where the second disconnection identifier is used to identify that an IPv6 PDP connection between the mobile broadband device and the network side is disconnected, the determining a connection state between the mobile broadband device and the network side according to the disconnection identifier, and setting the value of the state identifier included in the host to a connection identifier corresponding to the connection state includes, if the value of the state identifier included in the host is a second connection identifier, determining, according to the state identifier included in the host, that the mobile broadband device and the network side are in a second connection state before a current moment, where the second connection state is that the IPv6 PDP connection exists between the mobile broadband device and the network side; determining, according to the second disconnection identifier and the second connection state between the mobile broadband device and the network side before the current moment, that the mobile broadband device and the network side are in the disconnection state at the current moment, and setting the value of the state identifier included in the host to the identifier corresponding to the disconnection state; and if the value of the state identifier included in the host is a third connection identifier, determining, according to the state identifier included in the host, that the mobile broadband device and the network side are in a third connection state before a current moment, where the third connection state is that an IPv4 PDP connection and the IPv6 PDP connection exist between the mobile broadband device and the network side; determining, according to the second disconnection identifier and the second connection state between the mobile broadband device and the network side before the current moment, that the mobile broadband device and the network side are in a first connection state at the current moment, and setting the value of the state identifier included in the host to a first connection identifier corresponding to the first connection state, where the first connection state is that the IPv4 PDP connection exists between the mobile broadband device and the network side.

If the disconnection identifier is a third disconnection identifier, where the third disconnection identifier is used to identify that both an IPv4 PDP connection and an IPv6 PDP connection between the mobile broadband device and the network side are disconnected, the determining a connection state between the mobile broadband device and the network side according to the disconnection identifier, and setting the value of the state identifier included in the host to a connection identifier corresponding to the connection state includes determining, according to the third disconnection identifier, that the mobile broadband device and the network side are in the disconnection state, and setting the value of the state identifier included in the host to the identifier corresponding to the disconnection state.

In conclusion, according to the method provided in this embodiment of the present invention, a mobile broadband device sends identification information to a host, so that the host sets, according to the identification information, a value of a state identifier included in the host. Values of different state identifiers are corresponding to different connection states between the mobile broadband device and a network side. As long as the value of the state identifier is not an identifier corresponding to a disconnection state, the host queries the mobile broadband device and acquires an IP address; and as long as the value of the state identifier is the identifier corresponding to the disconnection state, the host disconnects from the network side. Compared with the prior art, in this embodiment of the present invention, regardless of a sequence of or a time interval between establishment of an IPv4 PDP connection and an IPv6 PDP connection by the mobile broadband device, a network does not need to be disconnected in a process in which the host acquires an IPv4 address and an IPv6 address, so that a data service of a user is not interrupted. In addition, after the host acquires the IPv4 address and the IPv6 address and one PDP connection of the IPv4 PDP connection and the IPv6 PDP connection between the mobile broadband device and the network side is disconnected, the host may further acquire an IP address corresponding to the other PDP connection and connect to a corresponding network, so that the user can use an available network more effectively.

It should be noted that the division of the foregoing functional modules is merely used as an example for description when the mobile broadband device and the host provided in the foregoing embodiments acquire an IP address. In an actual application, the functions may be allocated to different functional modules for implementation according to a requirement. That is, an internal structure of the mobile broadband device and the host is divided into different functional modules to implement all or part of the functions described above. In addition, the mobile broadband device and the host provided in the foregoing embodiments belong to a same concept as the embodiments of the method for acquiring an IP address. For a specific implementation process of the mobile broadband device and the host, refer to the method embodiments, details are not described herein again.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method for acquiring an Internet Protocol (IP) address, comprising:
    detecting existence of a Packet Data Protocol (PDP) connection between a mobile broadband device and a network side;
    determining a connection state of the PDP connection between the mobile broadband device and the network side when the PDP connection exists between the mobile broadband device and the network side;
    acquiring a connection identifier corresponding to the connection state when the connection state of the PDP connection between the mobile broadband device and the network side changes, wherein the connection identifier identifies the connection state of the PDP connection between the mobile broadband device and the network side; and
    sending the connection identifier to a host such that the host acquires the IP address of the host according to the connection identifier.

2. The method according to claim 1, wherein acquiring the connection identifier comprises:
    determining that the mobile broadband device and the network side are in a connected state; and
    acquiring the connection identifier corresponding to the connection state,
    wherein sending the connection identifier to the host comprises sending a connection reporting interrupting message to the host, and wherein the connection reporting interrupting message carries the connection identifier corresponding to the connection state.

3. The method according to claim 2, wherein determining that the mobile broadband device and the network side are in the connected state and acquiring the connection identifier corresponding to the connection state, comprises:
when an Internet Protocol version 4 (IPv4) PDP connection is established between the mobile broadband device and the network side and that an Internet Protocol version 6 (IPv6) PDP connection does not exist between the mobile broadband device and the network side, determining that the mobile broadband device and the network side are in a first connection state, and acquiring a first connection identifier corresponding to the first connection state;
when the IPv6 PDP connection is established between the mobile broadband device and the network side and that the IPv4 PDP connection does not exist between the mobile broadband device and the network side, determining that the mobile broadband device and the network side are in a second connection state, and acquiring a second connection identifier corresponding to the second connection state; and
either after the IPv4 PDP connection exists between the mobile broadband device and the network side and when the IPv6 PDP connection is established between the mobile broadband device and the network side, or after the IPv6 PDP connection exists between the mobile broadband device and the network side and when the IPv4 PDP connection is established between the mobile broadband device and the network side, determining that the mobile broadband device and the network side are in a third connection state, and acquiring a third connection identifier corresponding to the third connection state.

4. The method according to claim 1, wherein acquiring the connection identifier comprises acquiring a disconnection identifier when a PDP connection existing between the mobile broadband device and the network side is disconnected, wherein the disconnection identifier identifies that the PDP connection between the mobile broadband device and the network side is disconnected, wherein sending the connection identifier to the host comprises sending a disconnection reporting interrupting message to the host, and wherein the disconnection reporting interrupting message carries the disconnection identifier.

5. The method according to claim 4, wherein acquiring the disconnection identifier comprises:
acquiring a first disconnection identifier when an Internet Protocol version 4 (IPv4) PDP connection existing between the mobile broadband device and the network, side is disconnected, wherein the first disconnection identifier is used to identify that the IPv4 PDP connection between the mobile broadband device and the network side is disconnected;
acquiring a second disconnection identifier when an Internet Protocol version 6 (IPv6) PDP connection existing between the mobile broadband device and the network side is disconnected, wherein the second disconnection identifier is used to identify that the IPv6 PDP connection between the mobile broadband device and the network side is disconnected; and
acquiring a third disconnection identifier when both the IPv4 PDP connection and the IPv6 PDP connection existing between the mobile broadband device and the network side are disconnected, and wherein the third disconnection identifier is used to identify that both the IPv4 PDP connection and the IPv6 PDP connection between the mobile broadband device and the network side are disconnected.

6. A method for acquiring an Internet Protocol (IP) address, comprising:
receiving a connection identifier sent by a mobile broadband device, wherein the connection identifier identifies a Packet Data Protocol (PDP) connection between the mobile broadband device and a network side;
setting, according to the connection identifier, a value of a state identifier that is part of a host; and
acquiring the IP address of the host when the value of the state identifier is not an identifier corresponding to a disconnection state.

7. The method according to claim 6, wherein receiving the connection identifier comprises receiving a connection reporting interrupting message sent by the mobile broadband device, wherein the connection reporting interrupting message carries the connection identifier corresponding to a connection state between the mobile broadband device and the network side, and wherein setting the value of the state identifier comprises setting the value of the state identifier that is part of the host to the connection identifier corresponding to the connection state between the mobile broadband device and the network side.

8. The method according to claim 7, wherein setting the value of the state identifier comprises:
when the connection state between the mobile broadband device and the network side is a first connection state, setting the value of the state identifier that is part of the host to a first connection identifier corresponding to the first connection state, wherein the first connection state is that an Internet Protocol version 4 (IPv4) PDP connection exists between the mobile broadband device and the network side;
when the connection state between the mobile broadband device and the network side is a second connection state, setting the value of the state identifier that is part of the host to a second connection identifier corresponding to the second connection state, wherein the second connection state is that an Internet Protocol version 6 (IPv6) PDP connection exists between the mobile broadband device and the network side; and
when the connection state between the mobile broadband device and the network side is a third connection state, setting the value of the state identifier that is part of the host to a third connection identifier corresponding to the third connection state, wherein the third connection state is that the IPv4 PDP connection and the IPv6 PDP connection exist between the mobile broadband device and the network side.

9. The method according to claim 6, wherein receiving the connection identifier comprises receiving a disconnection reporting interrupting message sent by the mobile broadband device, wherein the disconnection reporting interrupting message carries the connection identifier comprises a disconnection identifier, wherein the disconnection identifier identifies that a PDP connection between the mobile broadband device and the network side is disconnected, and wherein setting, according to the connection identifier, the value of the state identifier the host comprises:
determining a connection state between the mobile broadband device and the network side according to the disconnection identifier; and setting the value of the state identifier that is part of the host to a connection identifier corresponding to the connection state.

10. The method according to claim 9, wherein the disconnection identifier is a first disconnection identifier, wherein the first disconnection identifier identifies that an Internet Protocol version 4 (IPv4) PDP connection between the mobile broadband device and the network side is disconnected, wherein determining the connection state between the mobile broadband device and the network side according to the disconnection identifier and setting the value of the state identifier that is part of the host to the connection identifier corresponding to the connection state comprises:
 when the value of the state identifier that is part of the host is a first connection identifier:
  determining, according to the state identifier that is part of the host, that the mobile broadband device and the network side are in a first connection state before a current moment, wherein the first connection state is that the IPv4 PDP connection exists between the mobile broadband device and the network side;
  determining, according to the first disconnection identifier and the first connection state between the mobile broadband device and the network side before the current moment, that the mobile broadband device and the network side are in the disconnection state at the current moment; and
  setting the value of the state identifier that is part of the host to the identifier corresponding to the disconnection state; and
 when the value of the state identifier that is part of the host is a third connection identifier:
  determining, according to the state identifier that is part of the host, that the mobile broadband device and the network side are in a third connection state before a current moment, wherein the third connection state is that the IPv4 PDP connection and an Internet Protocol version 6 (IPv6) PDP connection exist between the mobile broadband device and the network side;
  determining, according to the first disconnection identifier and the third connection state between the mobile broadband device and the network side before the current moment, that the mobile broadband device and the network side are in a second connection state at the current moment; and
  setting the value of the state identifier that is part of the host to a second connection identifier corresponding to the second connection state, and wherein the second connection state is that the IPv6 PDP connection exists between the mobile broadband device and the network side.

11. The method according to claim 9, wherein the disconnection identifier is a second disconnection identifier, wherein the second disconnection identifier identifies that an Internet Protocol version 6 (IPv6) PDP connection between the mobile broadband device and the network side is disconnected, wherein determining the connection state between the mobile broadband device and the network side according to the disconnection identifier and setting the value of the state identifier that is part of the host to the connection identifier corresponding to the connection state comprises:
 when the value of the state identifier that is part of the host is a second connection identifier:
  determining, according to the state identifier that is part of the host, that the mobile broadband device and the network side are in a second connection state before a current moment, wherein the second connection state is that the IPv6 PDP connection exists between the mobile broadband device and the network side;
  determining, according to the second disconnection identifier and the second connection state between the mobile broadband device and the network side before the current moment, that the mobile broadband device and the network side are in the disconnection state at the current moment; and
  setting the value of the state identifier that is part of the host to the identifier corresponding to the disconnection state; and
 when the value of the state identifier that is part of the host is a third connection identifier:
  determining, according to the state identifier that is part of the host, that the mobile broadband device and the network side are in a third connection state before a current moment, wherein the third connection state is that an Internet Protocol version 4 (IPv4) PDP connection and the IPv6 PDP connection exist between the mobile broadband device and the network side;
  determining, according to the second disconnection identifier and the third connection state between the mobile broadband device and the network side before the current moment, that the mobile broadband device and the network side are in a first connection state at the current moment; and
  setting the value of the state identifier that is part of the host to a first connection identifier corresponding to the first connection state, and wherein the first connection state is that the IPv4 PDP connection exists between the mobile broadband device and the network side.

12. The method according to claim 9, wherein the disconnection identifier is a third disconnection identifier, wherein the third disconnection identifier identifies that both an Internet Protocol version 4 (IPv4) PDP connection and an Internet Protocol version 6 (IPv6) PDP connection between the mobile broadband device and the network side are disconnected, and wherein determining the connection state between the mobile broadband device and the network side according to the disconnection identifier and setting the value of the state identifier that is part of the host to a connection identifier corresponding to the connection state comprises:
 determining, according to the third disconnection identifier, that the mobile broadband device and the network side are in the disconnection state; and
 setting the value of the state identifier that is part of the host to the identifier corresponding to the disconnection state.

13. A mobile broadband device, comprising:
 a memory comprising instructions;
 a processor coupled to the memory and configured to execute the instructions; and
 a network interface coupled to the processor and configured to communicate with a network side,
 wherein the processor is configured to detect existence of a Packet Data Protocol (PDP) connection between the network interface of the mobile broadband device and the network side,
 wherein the processor is configured to determine a connection state of the PCP connection between the network interface of the mobile broadband device and the network side when the PDP connection exists between the network interface of the mobile broadband device and the network side,
wherein the network interface is configured to acquire a connection identifier corresponding to the connection state when the connection state of the PDP connection between the network interface of the mobile broadband device and the network side changes,
wherein the connection identifier identifies the connection state of the PDP connection between the network interface of the mobile broadband device and the network side, and
wherein the network interface is configured to send the connection identifier to a host such that the host acquires an Internet Protocol (IP) address of the host according to the connection identifier.

14. The mobile broadband device according to claim 13, wherein the processor is further configured to:
determine that the mobile broadband device and the network side are in a connected state when the PDP connection is established between the mobile broadband device and the network side;
acquire a connection identifier corresponding to the connected state; and
send a connection reporting interrupting message to the host, and
wherein the connection reporting interrupting message carries the connection identifier that is corresponding to the connected state and acquired by the processor.

15. The mobile broadband device according to claim 14, wherein the processor is further configured to:
when an Internet Protocol version 4 (IPv4) PDP connection is established between the mobile broadband device and the network side and that an Inter et Protocol version 6 (IPv6) PDP connection does not exist between the mobile broadband device and the network side:
determine that the mobile broadband device and the network side are in a first connection state; and
acquire a first connection identifier corresponding to the first connection state;
when the IPv6 PDP connection is established between the mobile broadband device and the network side and that the IPv4 PDP connection does not exist between the mobile broadband device and the network side:
determine that the mobile broadband device and the network side are in a second connection state: and
acquire a second connection identifier corresponding to the second connection state; and
when, either after the IPv4 PDP connection exists between the mobile broadband device and the network side and the IPv6 PDP connection is established between the mobile broadband device and the network side, or after the IPv6 PDP connection exists between the mobile broadband device and the network side and the IPv4 PIP connection is established between the mobile broadband device and the network side:
determine that the mobile broadband device and the network side are in a third connection state: and
acquire a third connection identifier corresponding to the third connection state.

16. The mobile broadband device according to claim 13, wherein the processor is further configured to:
acquire a disconnection identifier when the PDP connection existing between the mobile broadband device and the network side is disconnected, wherein the disconnection identifier identifies that the PDP connection between the mobile broadband device and the network side is disconnected; and
send a disconnection reporting interrupting message to the host, and
wherein the disconnection reporting interrupting message carries the disconnection identifier acquired by the processor.

17. The mobile broadband device according to claim 16, wherein the processor is further configured to:
acquire a first disconnection identifier when an Internet Protocol version 4 (IPv4) PDP connection existing between the mobile broadband device and the network side is disconnected, wherein the first disconnection identifier identifies that the IPv4 PDP connection between the mobile broadband device and the network side is disconnected;
acquire a second disconnection identifier when an Internet Protocol version 6 (IPv6) PDP connection existing between the mobile broadband device and the network side is disconnected, wherein the second disconnection identifier identifies that the IPv6 PDP connection between the mobile broadband device and the network side is disconnected; and
acquire a third disconnection identifier when both the IPv4 PDP connection and the IPv6 PDP connection existing between the mobile broadband device and the network side are disconnected, and wherein the third disconnection identifier identifies that both the IPv4 PDP connection and the IPv6 PDP connection between the mobile broadband device and the network side are disconnected.

18. A host, comprising:
a memory comprising instructions;
a processor coupled to the memory and configured to execute the instructions; and
a network interface coupled to the processor and configured to communicate with a mobile broadband device,
wherein the network interface is configured to receive a connection identifier sent by the mobile broadband device,
wherein the connection identifier identifies a Packet Data Protocol (PDP) connection between the mobile broadband device and a network side,
wherein the processor is configured to set, according to the connection identifier, a value of a state identifier that is part of the host, and
wherein the network interface is configured to acquire an Internet Protocol (IP) address of the host when the value that is of the state identifier is not an identifier corresponding to a disconnection state.

19. The host according to claim 18, wherein the processor is further configured to:
receive a connection reporting interrupting message sent by the mobile broadband device, wherein the connection reporting interrupting message carries the connection identifier corresponding to a connection state between the mobile broadband device and the network side; and
set the value of the state identifier that is part of the host to the connection identifier corresponding to the connection state between the mobile broadband device and the network side.

20. The host according to claim 19, wherein the processor is further configured to:
set the value of the state identifier that is part of the host to a first connection identifier corresponding to a first connection state when the connection state between the mobile broadband device and the network side is the first connection state, wherein the first connection state is that an Internet Protocol version 4 (IPv4) PDP connection exists between the mobile broadband device and the network side;

set the value of the state identifier that is part of the host to a second connection identifier corresponding to a second connection state when the connection state between the mobile broadband device and the network side is the second connection state, wherein the second connection state is that an Internet Protocol version 6 (IPv6) PDP connection exists between the mobile broadband device and the network side; and set the value of the state identifier that is part of the host to a third connection identifier corresponding to a third connection state when the connection state between the mobile broadband device and the network side is the third connection state, wherein the third connection state is that the IPv4 PDP connection and the IPv6 PDP connection exist between the mobile broadband device and the network side.

\* \* \* \* \*